US011879163B2

(12) United States Patent
Burchtorf et al.

(10) Patent No.: US 11,879,163 B2
(45) Date of Patent: Jan. 23, 2024

(54) METHODS FOR MONITORING AND CONTROLLING CONTAMINANTS IN FOOD PROCESSING SYSTEMS

(71) Applicant: CHEMTREAT, INC, Glen Allen, VA (US)

(72) Inventors: John K Burchtorf, Glen Allen, VA (US); Megan Pettygrove, Glen Allen, VA (US); William H Henderson, Glen Allen, VA (US)

(73) Assignee: CHEMTREAT, INC, Glen Allen, VA (US)

( * ) Notice: Subject to any disclaimer, the term of this patent is extended or adjusted under 35 U.S.C. 154(b) by 846 days.

(21) Appl. No.: 16/622,369

(22) PCT Filed: Jun. 14, 2018

(86) PCT No.: PCT/US2018/037569
§ 371 (c)(1),
(2) Date: Dec. 13, 2019

(87) PCT Pub. No.: WO2018/232132
PCT Pub. Date: Dec. 20, 2018

(65) Prior Publication Data

US 2020/0172988 A1 Jun. 4, 2020

Related U.S. Application Data

(60) Provisional application No. 62/519,339, filed on Jun. 14, 2017.

(51) Int. Cl.
*C13B 20/00* (2011.01)

(52) U.S. Cl.
CPC .................................. *C13B 20/005* (2013.01)

(58) Field of Classification Search
CPC .................................................. C13B 20/005
(Continued)

(56) References Cited

U.S. PATENT DOCUMENTS 5,413,719 A 5/1995 Sivakumar et al.
5,645,799 A 7/1997 Shah et al.
(Continued)

FOREIGN PATENT DOCUMENTS

WO WO1999/051817 10/1999

OTHER PUBLICATIONS

The Origin of Lignin Fluorescence Bo Albinsson et al. J. Molecular Structure, V508, pp. 19-27 (Year: 1999).*
(Continued)

*Primary Examiner* — Douglas B Call
(74) *Attorney, Agent, or Firm* — Oliff PLC

(57) ABSTRACT

A method for determining the lignin or lignin by-product content of a process stream includes measuring the fluorescence parameter of a fluorescence spectra of the process stream, comparing the measured fluorescence parameter with predetermined a fluorescence parameter of lignin or lignin by-product reference samples, determining the amount of lignin or lignin by-product based on the comparison with the reference samples. Lignin or lignin by-products can then be removed from a process stream by adding a sufficient amount of a compound suitable for precipitating the lignin or lignin by-product to the process stream, and removing the precipitated lignin or lignin by-product from the process stream.

14 Claims, 20 Drawing Sheets

(58) Field of Classification Search
USPC .......................................................... 127/48
See application file for complete search history.

(56) References Cited

U.S. PATENT DOCUMENTS

| | | | | |
|---|---|---|---|---|
| 7,910,371 | B2 | 3/2011 | Johnson | |
| 8,515,581 | B2 | 8/2013 | Piironen et al. | |
| 8,893,612 | B2 | 11/2014 | Deneus et al. | |
| 2006/0160226 | A1* | 7/2006 | Johnson ............... | G01N 21/643 436/56 |
| 2011/0214669 | A1* | 9/2011 | Deneus .................. | C13B 20/12 127/11 |
| 2016/0068414 | A1 | 3/2016 | Ergang et al. | |

OTHER PUBLICATIONS

International Searching Authority, Notification of Transmittal of the International Search Report and the Written Opinion of the International Searching Authority or the Declaration, dated Aug. 27, 2018, p. 8.

* cited by examiner

METHODS FOR MONITORING AND CONTROLLING CONTAMINANTS IN FOOD PROCESSING SYSTEMS

This application claims the benefit of U.S. Provisional Application 62/519,339, filed Jun. 14, 2017. The disclosure of the prior application is hereby incorporated by reference herein in its entirety.

TECHNICAL FIELD

This application is directed to methods for monitoring and controlling contaminants in industrial processing systems, such as food processing systems.

BACKGROUND

The production of sugar from sugar cane and sugar beets is an ancient art. Research has shown that crystalizing of sugar from sugar cane began in India in $5^{th}$ century AD. Many advances have been made to improve purity, color and crystal size as well as extraction rates to improve the quality of sugar. However, one of the biggest challenges of a sugar mill or beet sugar factory continues to be the contamination of boiler feedwater. It is common for sugar juice to contaminate feedwater and 20 ppm of sugar is often enough contamination to consume the alkalinity of boiler water at normal operating cycles of concentration. Once alkalinity is consumed, boiler water pH can drop very quickly, resulting in an acidic condition of boiler water. High levels of sugar contamination can cause iron deposit to be removed and attack of tube base metal. Other organic contaminants lead to similar results, causing damage and/or fouling surfaces, and without specific response based on sugar upset guidelines, boiler failure is often the result.

In sugar beet processing, poor beet quality can cause a multitude of issues in purification, filtration, settling, and limesalt removal, and also may result in high color levels of juice and sugar obtained from the processing of the sugar beets. In conventional operations, adjustments to various steps in the processing of sugar beets can be made by factory personnel to adjust for juice quality issues to maintain product quality and keep slice (process throughput) levels as high as possible. The adjustments made may be based on analytical data and the experience of operating personnel. Much of the experience is a result of the "art of making sugar" including general know-how of day-to-day operations of the sugar processing plant.

Conventional process control methods in food processing or sugar production are performed through accumulation of chemistry data, density, flows, color monitoring, temperature, density readings, etc. This data is then analyzed and adjustments are made to reagent addition, temperature, flows to improve performance.

For example, U.S. Pat. No. 2,926,110 describes a process for the purification of beet sugar juice by passing the juice through a series of ion exchange resins.

U.S. Pat. No. 2,273,253 is directed to beet sugar manufacture in which raw beet juice is treated with a calcium compound derived from slaking calcium oxide, and then introducing carbon dioxide into the juice to clarify the juice.

U.S. Pat. No. 1,578,463 describes a process of manufacturing beet sugar that utilizes sodium aluminate that allows for better filtration as well as to remove lime present in the purification process.

U.S. Pat. No. 4,933,087 describes a process for recovery of fats and proteins from food processing wastewaters with alginates.

U.S. Patent Application Publication No. 2005/0229813 is directed to a process for sugar cane juice clarification in which a source of lime and an anionic inorganic colloid or polyacrylamide are added to the juice, followed by carbonating the juice.

There has been an extensive amount of testing done to find a suitable means of identifying contamination of the condensate stream that contributes to boiler feedwater. Some of the monitoring devices include conductivity, ORP, sodium analyzer, potassium analyzer, flame chromatography, atomic absorption and refractometers. More recently fluorometers have become the method of choice due their high sensitivity and ease of use. Fluorometers usually have a set excitation/emission wavelength to detect specific molecules within a solution, reducing interference from other compounds. However, online fluorometers need to be cleaned and calibrated frequently to prevent false alarms. Frequent false alarms give rise to ambivalence by operators as it is difficult to identify a real alarm or a leak. An additional challenge of using fluorescence is that sugar does not fluoresce. Due to these challenges, the inventors studied how contaminants were carried through a sugar factory in order to better understand how to detect and mitigate boiler feedwater contaminants.

In a conventional beet processing system, such as is shown in FIG. 1, sugar beets may be sliced as fast as they arrive at the facility or, more commonly stored before slicing. This time spent out of the ground in storage can cause beets to rot and begin germination. Additionally, lignins and non-sugars are usually higher for aged beets. Once the beets arrive they are sent to the slicer where they are sliced into cossettes that may resemble either ruffles potato chips, or shoestring potatoes depending on beet quality at the time. From the slicer they are sent to a diffuser to extract the sugar. After the diffusers, the water contains solid particles, dissolved sugars and dissolved non-sugars. The sugar content is around 14-18% in solution and 85-92 purity. In order to remove the non-sugars, such as lignin or tannin, lime is added to raise the pH to around 11-12 which helps facilitate coagulation of particulates and non-sugars. After the first lime addition and the juice is heated and more lime is added to react any non-sugars that remain dissolved. At the carbonation stages, the pH is dropped to 9.8-10.5 by adding $CO_2$ to help solids precipitate. From the Dorr or clarifier overflow after $1^{st}$ carbonation, the juice is sent to a $2^{nd}$ carbonation step and subsequent steps, as needed. After filtration, the juice is referred to as "thin juice". It is a light amber color and is typically is around 14-18% sugar in solution at around 88-92% purity. Thin juice goes through five to seven evaporator stages, which concentrate the juice into "thick" juice. The "thick juice" is high in dissolved sugar around 60-65%. Thick juice and a mixture of syrup returns from the spinners, are blended in the standard liquor tank, filtered, and sent to the vacuum pan to crystallize into white sugar. That portion of the syrup that can no longer be crystallized into sugar is sent to the molasses tanks. Separators or MD (molasses desugarization) processes may help remove sugar from the molasses with remaining liquor being used for animal feed or dust control. Cane molasses is marketed for use by consumers or consumer products.

Lignins are found in cells of vascular plants, such as sugar beets. Lignins have a polyphenolic structure that is highly cross-linked. Lignin is a contaminant that is largely ignored in conventional processes and thought to be destroyed in the purification part of the beet end.

SUMMARY

None of the references described above discuss how lignin and lignin decomposition products are responsible for contributing to the lowered quality of juice and sugar that are obtained from sugar beet and cane processing systems. Thus, the above-referenced processes have a disadvantage in knowing when it is necessary to purify the process stream, and how much of various purification compositions should be added to the process stream in order to purify it.

These and other issues are addressed by the present disclosure. It is an object of this disclosure to provide novel process control enhancements that can be used to monitor, diagnose, reference and in some cases automate control of vegetable processing operations. Advantages include evaluating processes for making sugar by identifying, tracking and controlling the amount of lignin and lignin by-products by determining the amount of lignin or lignin by-product in the sugar juice process stream by fluorescence spectroscopy or cationic demand, adding a sufficient amount of a compound suitable for precipitating the lignin or lignin by-product to the sugar juice process stream, and removing the precipitated lignin or lignin by-product from the sugar juice process stream. Further advantages include improving settling and control of waste stream solids removal in wastewater containing lignin by compensating for the ionic demand imparted by the contaminant.

In a first embodiment, there is provided a method for controlling an amount of an anionic contaminant in a stream of a sugar processing system. The method may include determining an amount of the anionic contaminant in the stream using a fluorescence parameter or cationic demand parameter of the anionic contaminant, the anionic contaminant selected from at least one of the group consisting of lignin, a lignin by-product, tannin, and a tannin by-product, and controlling an amount of the anionic contaminant in the stream based on the determined amount of the anionic contaminant in the stream.

The amount of the anionic contaminant may be determined in a thin juice stage of the sugar beet processing system.

The anionic contaminant may be the lignin by-product or the tannin by-product, and the amount may be determined downstream of a thin juice stage of the sugar beet processing system.

The anionic contaminant may be undetectable using the fluorescence parameter or the cationic demand parameter before a thin juice stage of the sugar beet processing system.

The controlling the amount of the anionic contaminant in the stream may include removing at least some of the anionic contaminant from the stream. Removing the at least some of the anionic contaminant from the stream may include destroying, neutralizing or precipitating the anionic contaminant. Removing the at least some of the anionic contaminant from the stream may include precipitating the anionic contaminant by adding a sufficient amount of a precipitator compound configured to precipitate the anionic contaminant from the stream. The removing step may occur upstream of a boiler stage in the sugar processing system.

In another embodiment, there is provided a method for determining a content of an anionic contaminant in a stream of an industrial processing system. The method may include measuring a fluorescence parameter or cationic demand parameter of an anionic contaminant in the stream, the anionic contaminant selected from at least one of the group consisting of lignin, a lignin by-product, tannin, and a tannin by-product, comparing the measured parameter with that of a premeasured parameter of anionic contaminant reference samples, and determining the amount of the anionic contaminant based on the comparison with the reference samples.

The anionic contaminant may be at least one of the lignin or the lignin by-product. The anionic contaminant may be at least one of the tannin and the tannin by-product.

The amount of the anionic contaminant in the stream may be controlled to a predetermined threshold, and the predetermined threshold may correspond to an acceptable amount of surface fouling in the processing system.

The anionic contaminant may be selected from at least one of lignin by-product and tannin by-product. The fluorescence parameter or the cationic demand parameter may be measured in the processing system downstream of a stage that adds heat to the stream.

The method may further comprise measuring the fluorescence parameter or the cationic demand parameter of at least two anionic contaminants in the stream.

BRIEF DESCRIPTION OF THE DRAWINGS

FIGS. 5A and 8B show P and M alkalinity distribution over steps of a beet processing method according to disclosed embodiments.

DETAILED DESCRIPTION OF EMBODIMENTS

Figure 1:
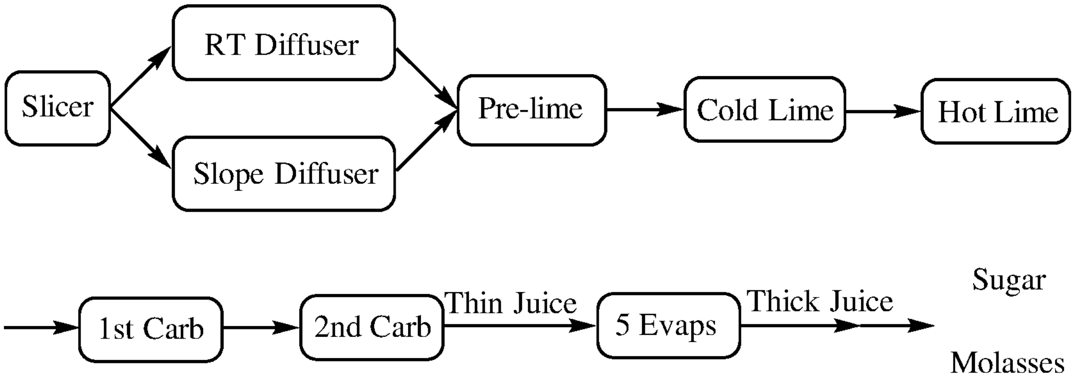
FIG. 1 (RELATED ART)
FIG. 1 illustrates a process diagram for a typical beet processing method.
Figure 2:
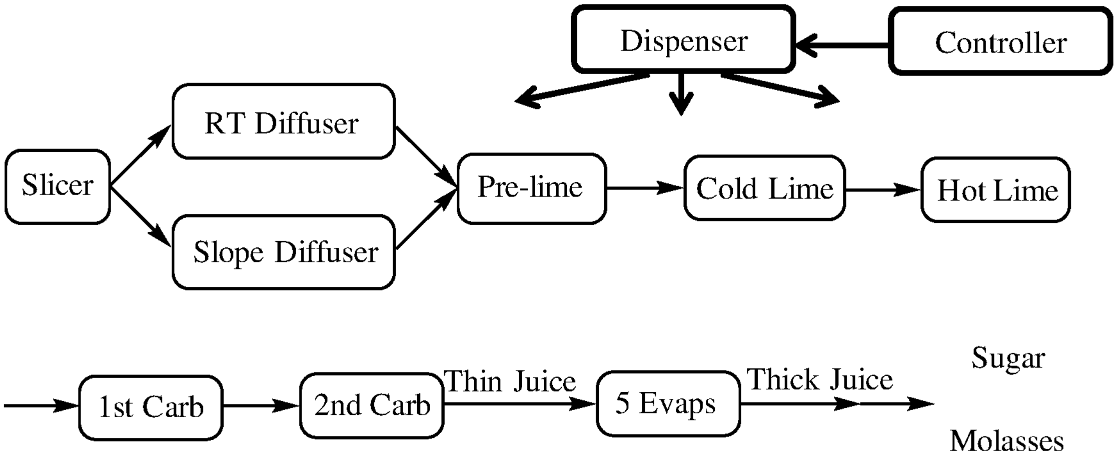
FIG. 2 illustrates a process diagram for a processing method according to disclosed embodiments.

Disclosed embodiments include methods for controlling an amount of an anionic compound in water of an industrial processing system, as shown in FIG. 2. The methods include measuring a fluorescence intensity signal or cationic demand of at least one anionic compound in the water during a first time period, comparing the measured fluorescence intensity signal or cationic demand with a predetermined fluorescence intensity signal or cationic demand of at least one reference sample of the anionic compound, determining an amount of the anionic compound in the water based on the comparison with the reference sample, and controlling an amount of the anionic compound in the water based on the determined amount of the first anionic compound in the water.

Disclosed methods are applicable to any industrial processing system and include food or vegetable processing or pulp processing systems that contains fluorescent signatures or anionic compounds with cationic demand. Examples include, but are not limited to, sugar beet, sugar cane, carrot and potato processing systems that process the foods or vegetables.

By using fluorescence to track naturally occurring contaminants such as lignin or lignin by-products that result from the breakdown of lignin, the quality of the liquid stream can be evaluated and adjustments to various chemical additives to the liquid stream made to compensate for deteriorating or improving quality of the process or waste stream that is being monitored.

In the case of sugar (sucrose) processing facilities, lignins are released into the process streams from the sugar beet or cane. As quality of the supply of sugar beet or cane degrades (due to infections, storage conditions, age of beets), higher levels of lignins are realized in the process streams. Because the lignins are anionic in charge due to the presence of phenolic hydroxyl groups, they impose a cationic demand to neutralize in order to provide the best possible purification of the liquor or juice of mineral salts, color bodies and non-sugars.

Waste streams can also contain lignins that impart an anionic charge to the waste stream which can interfere with clarification of the waste stream. The fluorometer can be utilized to identify and quantify the amount of lignin in the stream and programmed to control additions of chemicals and reagents to eliminate the impact of the lignin from impairment of processing the process or waste stream.

Cation demand tests conducted during fair and poor quality of sugar beet processing show an increased level of cation demand during test periods for poor quality beets as opposed to that of fair quality beets. In the purification of the juice stream, cation demand during poor beets exhibited a reduction of demand from a peak of 26 ppm in raw juice to 1.5 ppm exiting the purification process (2nd carb filters).

Disclosed embodiments include methods for determining contamination of boiler supply water from evaporator condensate. Beet quality with regard to the amount of contaminants present in the beet may vary according to the time of the season when the beets are harvested, and generally, beet quality decreases later in the season. During processing, these contaminants carry through the thin juice.

Thin juice is the fluid containing dissolved raw sugar. In some processes, the thin juice may have between 12.5-13.5% solids. In other processes, thin juice has from 13 to 16%, Usually, the solids comprise about 90% sugar. However, these parameters can vary depending on the process and facility, condition of the beets, climate, water levels, draft for diffusion and brix adjustments due to processing dynamics at the time. The quality of the beets can vary hour to hour and day to day depending on the storage conditions of the beets. The condition of the beets is critical because as the beet quality degrades, the cellulose structure/integrity allows for increased lignin to be released in the diffusion process.

In some processes, the thick juice has around 50-60% solids, with 90% being sugar. In other processes, the thick juice may have from 58-62% solids. As with thin juice, these parameters can vary.

As the thin juice goes through the evaporator stages, more contaminant will foul evaporators. The lignins or contaminants at least partially are modified to allow volatilization in the evaporators and are carried in the vapor from one body of the stream and supplied to the next body as the heat (or steam) source to continue evaporation of the next evaporator body. This vapor is condensed, carrying the lignins or contaminants to the boilers in the boiler feedwater. The lignins or contaminants then can be volatilized and carried out in the boiler steam.

In one embodiment, the method utilizes fluorescence spectroscopy to quantify process contamination of a condensate so that operators may be alerted and act accordingly. Baseline levels for the alarm set point increase rather dramatically with poor beet quality. If the alarm is set at a certain threshold, the poor beet quality will cause contaminants to breach that threshold if nothing is done, but this process will allow you to react and prevent fouling of the evaporators.

Analysis of juice streams has shown various levels of lignin in process streams and condensate streams.

Four samples of various sugar beet processing liquids from Amalgamated Sugar (Boise, Id.) were analyzed. The "first carb" sample occurs right after the hot limer and is maintained at a pH from 10.9 to 11.1. After clarification, second carb, and filtration, "thin juice" is obtained.

In other embodiments, a cossette mixer is arranged between the slicer and the diffuser. The diffusers (2) are tower diffusers. After 1st carb (carbonation) there is a clarifier to settle the suspended solids with the overflow feeding 2nd carb. The outflow from 2nd carb goes to filters (normally industrial leaf filters), then softening. After softening, the juice becomes evaporator supply or thin juice. The thin juice goes through a 7 effect evaporator train where in general terms the sugar content goes from 14% (brix) to 60% (brix) to become thick juice. During poor beet quality conditions, there was 3-3.5% lime on beets and 1-3 ppm of coagulant (P823L) to improve purification and settling performance.

The process from the start (slicing) to thick juice is referred to as the "beet end". The rest of the process (pans, standard liquor filters, high green, low raw, white pans, crystallizer, spinners, granulators, etc. is termed the "sugar end" of the factories. Any lignins and tannins or other contaminants that make it through to thick juice will end up in the molasses stream of the sugar end.

The sample of thin juice had a pH of 6.7.

The thin juice is sent to multiple evaporators to remove liquid of the juice to form a sugar-containing concentrate. The condensate from the first evaporation was labeled "first drip" and the condensate from the second evaporation, labeled "second drip."

3D fluorescence scans taken from each sample show how fluorescence changes throughout the system. The initial fluorescence scans show the impurity present in the 1st carb and thin juice (lignins, tannins, etc.). The 3D fluorescent graphs show the excitation and emission of the initial contaminant. This is also demonstrates how pH change alone is not sufficient to cause breakdown of the contaminant. As we have shown, under the evaporator conditions, the contaminant breaks down into a different species (1st drips, 2nd drips), noted by the change in fluorescence. These breakdown products have a lower excitation and emission. That breakdown product either has a low enough boiling point or can sublime, and is carried through the evaporator into the condensate.

The excitation and emission maxima showed similar results for the first carb and thin juice, but changed dramatically in the 1st drips and again in the 2nd drips. Fluorescent intensity can be related to concentration.

TABLE 1

Fluorescence excitation and emission maxima for samples.

| Sample | Excitation (nm) | Emission (nm) |
|---|---|---|
| Carb Juice | 404 | 482 |
| Thin Juice | 388 | 474 |
| 1st Drips | 274 | 334 |
| 2nd Drips | 266, 302 | 332, 336 |

Lignins and tannins are responsible for the fluorescence in the 1st carb and thin juice. The fluorescent compounds in the 1st drips and 2nd drips must be of significantly lower Mw as compared to the initial contaminant and nonpolar or have the ability to sublime in order to make it to the evaporate condensate. Lignins and tannins can have varying Mw and be made of a lot of different components.

The evaporation conditions were substantially reproduced in this test by distilling the thin juice in a rotary evaporator at 80° C. under reduced pressure. After thin juice had been distilled to approximately 50% of its starting volume, fluorescence of the distillate and the pot were measured again.

After replicating the evaporator conditions, the excitation and emission maxima of the fluorescence of the condensate Obtained by rotary evaporation (304 ex, 340 em) was similar to the 1st drips obtained above in the process of the four samples, and similar to one of the fluorescence maxima from the 2nd drips. The fluorescence spectra obtained from evaluating the pot resembled the fluorescence spectra of the initial thin juice. Thus, the evaporator conditions in the lab may be replicated to show that the contaminant breaks down and can be carried to the condensate under evaporator conditions.

These results show that contaminants are carried through the first carp process and that these contaminants or breakdown products can result in contamination of evaporators and boilers further down in the process.

By monitoring for these compounds (through fluorescence and/or cation demand) chemical treatment feeds can be adjusted or mechanical removal methods used to adequately remove contaminants as quality of the organic matter increases or decreases in quality. Additional coagulants, flocculants or other or water treatment chemicals can be used to remove excess contaminant.

Beet sugar processing utilizes copious amounts of CaO or lime for purification of the raw juice (stream off the diffuser) stream. In one cation demand test, there was a demand of 26 ppm (poor quality beets) in the raw juice off the diffuser and dropped to 7-9 ppm through the liming stages and further to 2-4 ppm through 1st carbonation. Samples taken after 2nd carbonation filtering were still at 2 ppm.

Lime reduces the demand either by destruction, charge neutralization or precipitation. The ability to determine this demand in real time may allow the factories to vary lime addition by the proper amount needed to achieve optimal purification. Any remaining demand can be neutralized with the addition of an approved coagulant (P823L) automatically from determination of demand from the subject patent process.

Approved flocculation polymers are anionic in nature. The presence of an anionically charged compound such as lignin can prevent proper settling and clarification of the juice stream. Other issues include turbidity of overflow, high color imparted by lignin, tannin and other color bodies, and poor filtration performance.

The values and ranges of fluorescence in the graphs can be used to monitor contaminants and breakdown products. The concentrations can be quantified based on relative excitation and emission intensities, but not absolute values at this time.

This above monitoring process may also be used in the pulp or paper industry in wood products wastewater stream such as paper and pulp streams. In paper processing, calcium and aluminum compounds are used to neutralize and precipitate lignin in the bleaching water of chemical pulp (CA2573035C). Calcium is known to precipitate lignin.

This same process can help determine demand from the lignin for coagulants and other reagents to improve performance of beet and potato flume clarifiers, and vegetable waste water streams.

The advantages of disclosed embodiments include, but are not limited to: consistency of purification of the subject stream under a wide range of operating conditions, enhanced settling and removal of suspended solids. (reduced turbidity of overflow), improved elimination of non-sugars and color bodies imparted by the lignins and tannins, improved filtration performance and dewatering, higher process throughput from 1-4 above, improved quality and purity of the process stream from improved contaminant elimination, improved final product production rates during poor quality stream conditions, cleaner boiler and steam system through reduction in fouling contaminants (if applicable), improved conformance to discharge requirements (if applicable), and automation of the evaluation process.

EXAMPLES

Prototype fluorescent probes were built to measure the fluorescent breakdown products at beet sugar factories. The prototypes were installed on $2^{nd}$ evaporator drips ($1^{st}$ vapor). The units were equipped with a sample cooler, high sample temperature shutoff, wireless wifi modem for remote access an alarm and a CIP system if needed.

The factories had undergone a significant upsizing immediately before the campaigns. Beet quality was very poor, in the range of 82-83% purity. Background fluorescence of condensate was identified and scaled with alarm points determined to alarm at 0.01% juice relative to contaminate level in the condensate. The PLC could be accessed remotely to fine tune the prototype. However, supervisors manned the units for over a week to gather data and make changes as necessary quickly.

Operating conditions and "kinks" due to factory modifications provided ample opportunity to verify alarm reality. Several alarms were recorded during the first few days with varying level of severity. Most were small, short lived and some were moderate, short lived. Verification tests were to be alpha napthal and refractometer if high enough. No events were of length to verify sugar levels, but the moderate event effect manifested verification in loss of boiler alkalinity and pH depression. The prototypes were allowed to run for almost 2 months to provide data and warnings to operation personnel. This also allowed tuning and adjustments to be made remotely while downloading of data points and trend information.

The outcome of the field tests were successful in the respect that the unit ran and provided reliable data and did not require cleaning or calibration for that test period.

Previous experience with similar monitors require regular cleaning and calibration as well as frequent false alarms.

Example 1

Figure 3A:
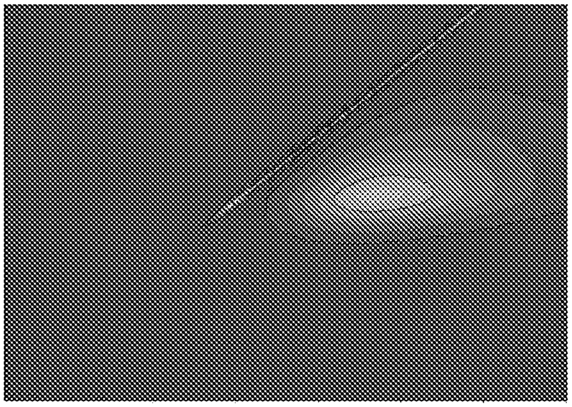
FIGS. 3A, 3B, 3C, 3D, 3E and 3F show three-dimensional fluorescence spectra of samples taken from a beet processing method according to disclosed embodiments.
Figure 3B:
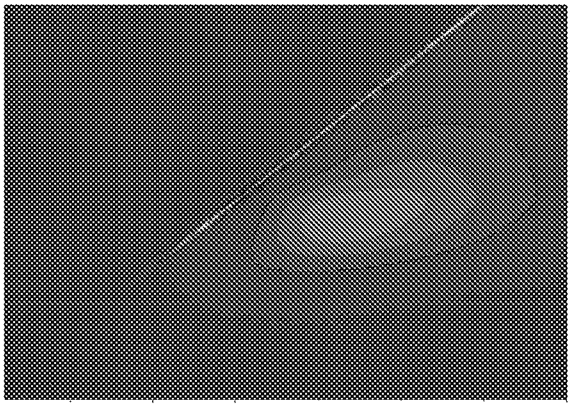

This example is from a facility that processes sugar beets. Because non-sugars are decreased through the $1^{st}$ and $2^{nd}$ carb purification process, which uses lime and flocculant, studies were initiated by using a testing protocol to model canon demand. Samples were tested from several locations such as raw juice, liming, carbonation, $1^{st}$ carb clarifier overflow, and $2^{nd}$ carb filtrate. There was a significant cation demand in the raw juice (26 ppm) followed by a drop in demand through purification, giving evidence that the non-sugar impurities are likely anionic. The final sample of $2^{nd}$ carb filtrate still indicated a 2 ppm cation demand. The presence of the cation demand accompanied by persistence through the purification process helped inventors to focus in on potential species that have an anionic charge. Using 3D fluorescence, inventors identified the fluorescent non-sugar species as lignins and tannins, which are not typical compounds tested for in most industry methodology. A 3D fluorescence spectrum for $1^{st}$ carb (FIG. 3A) and thin juice (FIG. 3B) indicates a significant spectrum necessarily indicating more than one non-sugar component from the stream is picked up in 3D fluorescence modeling.

Figure 3C:
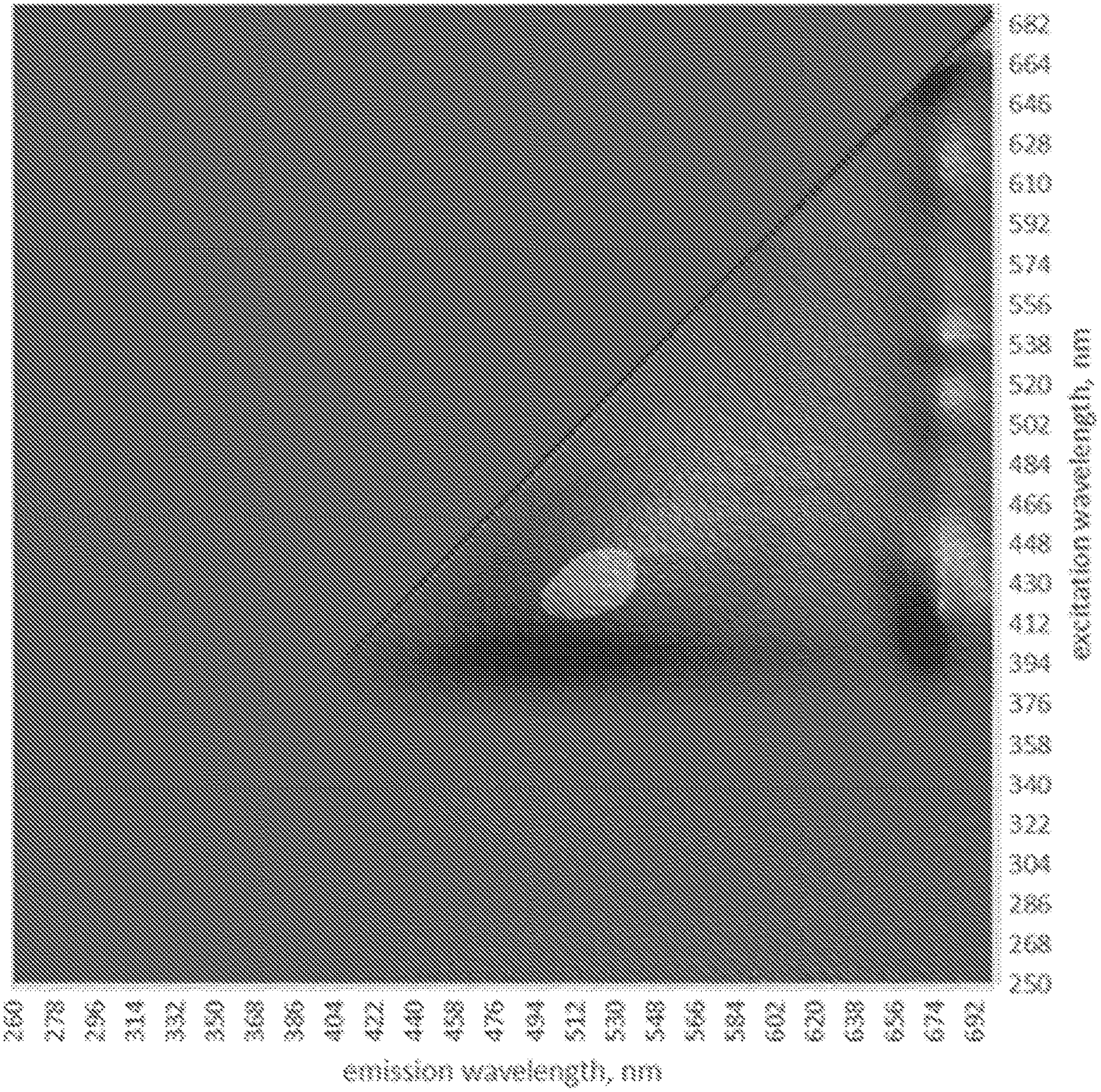

The fluorescence spectrum for both first carb and thin juice shows a broad excitation from 380-470 and emission from 440-540 with an excitation/emission maxima at 395/480. The diagonal line running across the spectra is an artifact from excitation wavelengths that are not fully absorbed and therefore measured on the emission spectrum. It is apparent, that the fluorescence intensity decreases after the carbonation stage, further indicating that dissolved non-sugars are removed during the carbonation process. A similar spectrum is shown for cane sugar production in FIG. 3C. The 3D fluorescence spectrum in FIG. 3C has a broad excitation from 380-490 and emission from 460-520 with an excitation/emission maximum at 420/500.

From this data, inventors were able to pinpoint an excitation and emission wavelength to track pH, lignins and tannins, nitrates, nitrites, P alkalinity and M alkalinity throughout the purification process. The profiles of two seperate tests are illustrated in Tables 2 and 3, respectively, below.

| Sample # | Sample Name | pH | Tannin Lignin (mg/L) | Nitrate (mg/L) | Nitrite (mg/L) | P Alkalinity | M Alkalinity |
|---|---|---|---|---|---|---|---|
| 1 | Rotary Screen Influent | 4.44 | 280 | 0.53 | 9.1 | — | — |
| 2 | Pre-limer Cell 1 | 5.43 | 350 | 1 | 5 | — | 1094 |
| 3 | Pre-limer Cell 4 | 10.32 | 300 | 130 | 2.5 | 822 | 1783 |
| 4 | Pre-limer Cell 5 | 11.31 | 250 | 116 | 11 | 1906 | 3834 |
| 5 | Pre-limer Cell 6 | 11.74 | 250 | 124 | 13 | 4402 | 6848 |
| 6 | Pre-limer Outlet | 11.76 | 260 | 143 | 5 | 4656 | 6956 |
| 7 | Cold Limer Effluent/Outlet | 11.89 | 270 | 110 | 9.9 | 6530 | 8996 |
| 8 | Hot Limer Effluent/Overflow | 12.07 | 260 | 116 | 16 | 11472 | 13330 |
| 9 | 1st Carb Effluent/Overflow | 11.17 | 190 | 110 | 29 | 1344 | 2516 |
| 10 | Pultsch Mud Supply | 11.23 | 180 | 108 | 12 | 1536 | 2950 |
| 11 | Pre-limer Sludge Recycle | 4.30 | 370 | 0.63 | 2.5 | — | — |
| 12 | DORR Clarifier Effluent Clear Overflow | 11.04 | 160 | 103 | 12 | 1188 | 2228 |
| 13 | Pre-limer Recirculation Sludge | 11.20 | 160 | 100 | 12 | 1452 | 2574 |
| 14 | 2nd Carb, 1st Body Effluent/Overflow | 8.94 | 160 | 80 | 19 | 139 | 889 |
| 15 | 2nd Carb Retention Supply | 8.61 | 215 | 107 | 13 | 55 | 852 |
| 16 | 2nd Carb Retention Overflow | 9.22 | 215 | 0.82 | 2.5 | 261 | 1191 |
| 17 | 2nd Pass Filter Effluent | 9.10 | 205 | 50 | 5 | 214 | 1239 |
| 18 | Softener Supply Tank | 9.17 | 215 | 3.7 | 80 | 251 | 1252 |
| 19 | Softened Juice | 9.11 | 215 | 110 | 12 | 217 | 1203 |
| 20 | Sulfur Tower Effluent | 8.91 | 220 | 103 | 5 | 178 | 1137 |
| 21 | Sulfured Juice Tank | 8.93 | 326 | 100 | 5 | 175 | 1130 |
| 22 | Flume Water | 11.58 | 220 | 47 | 39 | 1563 | 1644 |
| 23 | 1A Evaporator Drips | 10.14 | 1.3 | 0.1 | 0.5 | 235 | 280 |
| 24 | 1B Evaporator Drips | 10.10 | 1.1 | 0.1 | 0.5 | 179 | 213 |
| 25 | 2B Evaporator Drips | 9.92 | 3.2 | 0.1 | 0.5 | 563 | 735 |

| Sample # | Sample Name | pH | Tannin Lignin (mg/L) | Nitrate (mg/L) | Nitrite (mg/L) | P Alkalinity | M Alkalinity |
|---|---|---|---|---|---|---|---|
| 1 | Raw Juice | 4.36 | 330 | 1.1 | 2.5 | 0 | 0 |
| 2 | DORR Clarifier Influent | 11.14 | 250 | 214 | 9 | 806 | 2454 |
| 3 | DORR Overflow | 11.22 | 200 | 186 | 5 | 1094 | 2305 |
| 4 | DORR Mud Pump underflow to Putsch | 11.43 | 250 | 200 | 7.3 | 1946 | 4030 |
| 5 | Thin Juice | 8.87 | 190 | 211 | 18 | 181 | 1380 |
| 6 | Thick Juice | 8.19 | 480 | 975 | 10 | 0 | 3951 |
| 7 | Clarifier Influent | 4.88 | 160 | 6.8 | 5 | 0 | 1385 |
| 8 | Clarifier Over flow | 4.99 | 140 | 22 | 5 | 0 | 1320 |
| | Clarifier Underflow | 6.11 | | | | | |

Figure 5A:
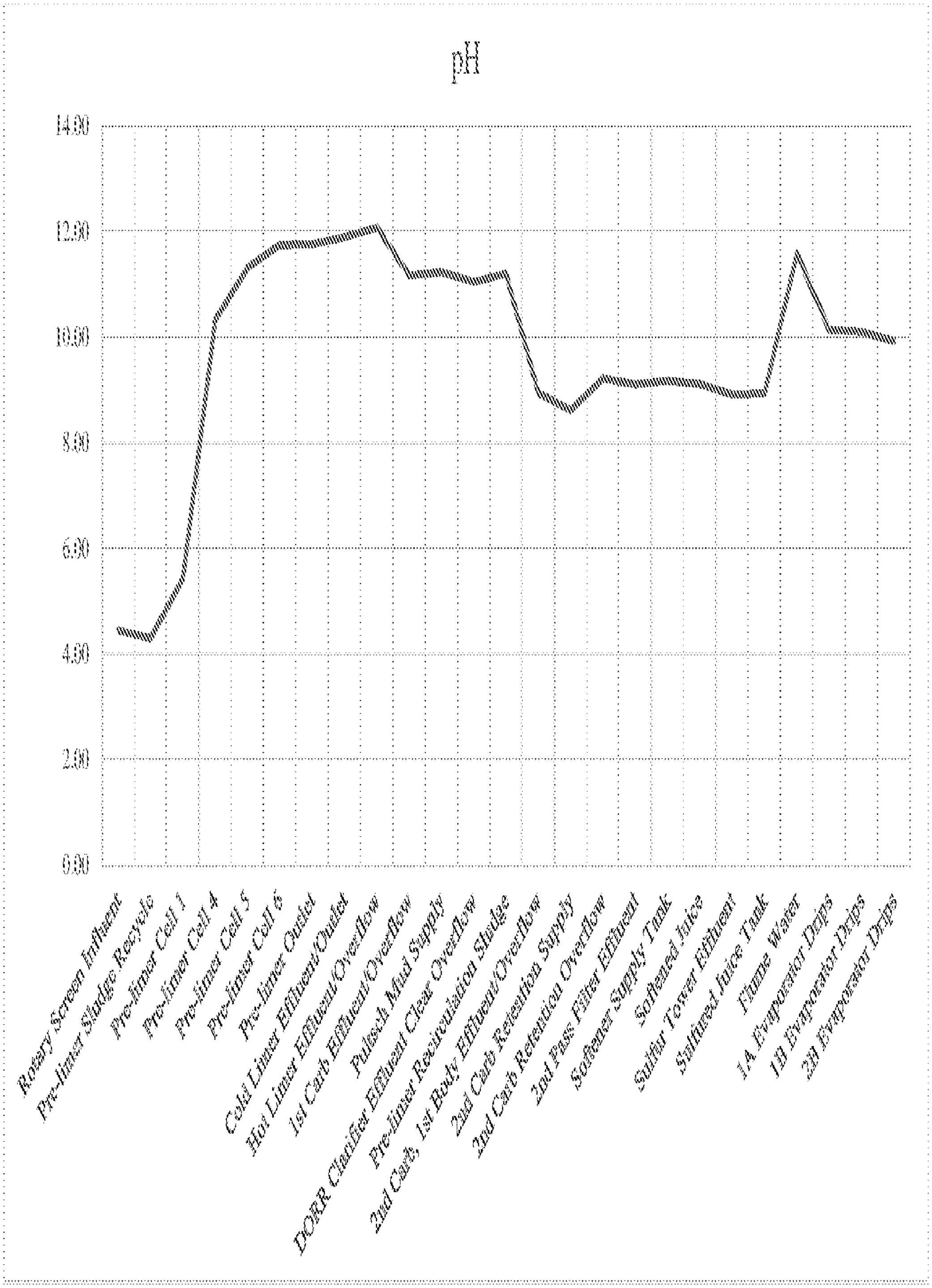
FIGS. 5A and 5B show pH distribution over steps of a beet processing method according to disclosed embodiments.
Figure 5B:
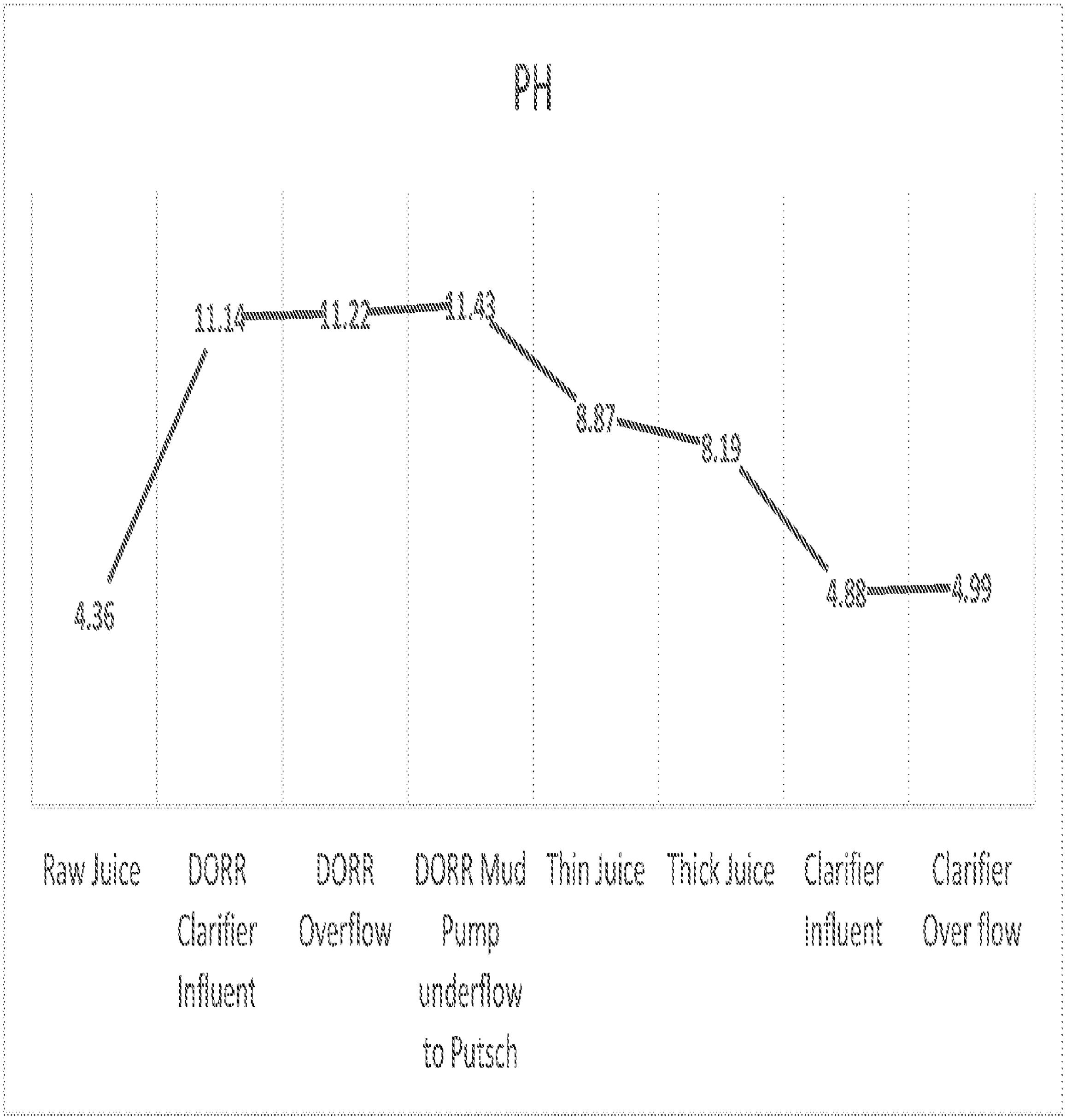

As seen in FIGS. 5A and 5B, in order to remove the non-sugars, lime is added to raw juice to raise the pH to around 11-12 which helps facilitate coagulation of particulates and non-sugars. At the carbonation stages, the pH is dropped by adding $CO_2$ to help solids precipitate. From the Don or clarifier overflow after $1^{st}$ carbonation, the juice is sent to another carbonation step or $2^{nd}$ carb. After filtration, the juice is referred to as "thin juice". The thin juice goes through five to seven evaporator stages, which concentrate the juice into "thick" juice.

Figure 6A:
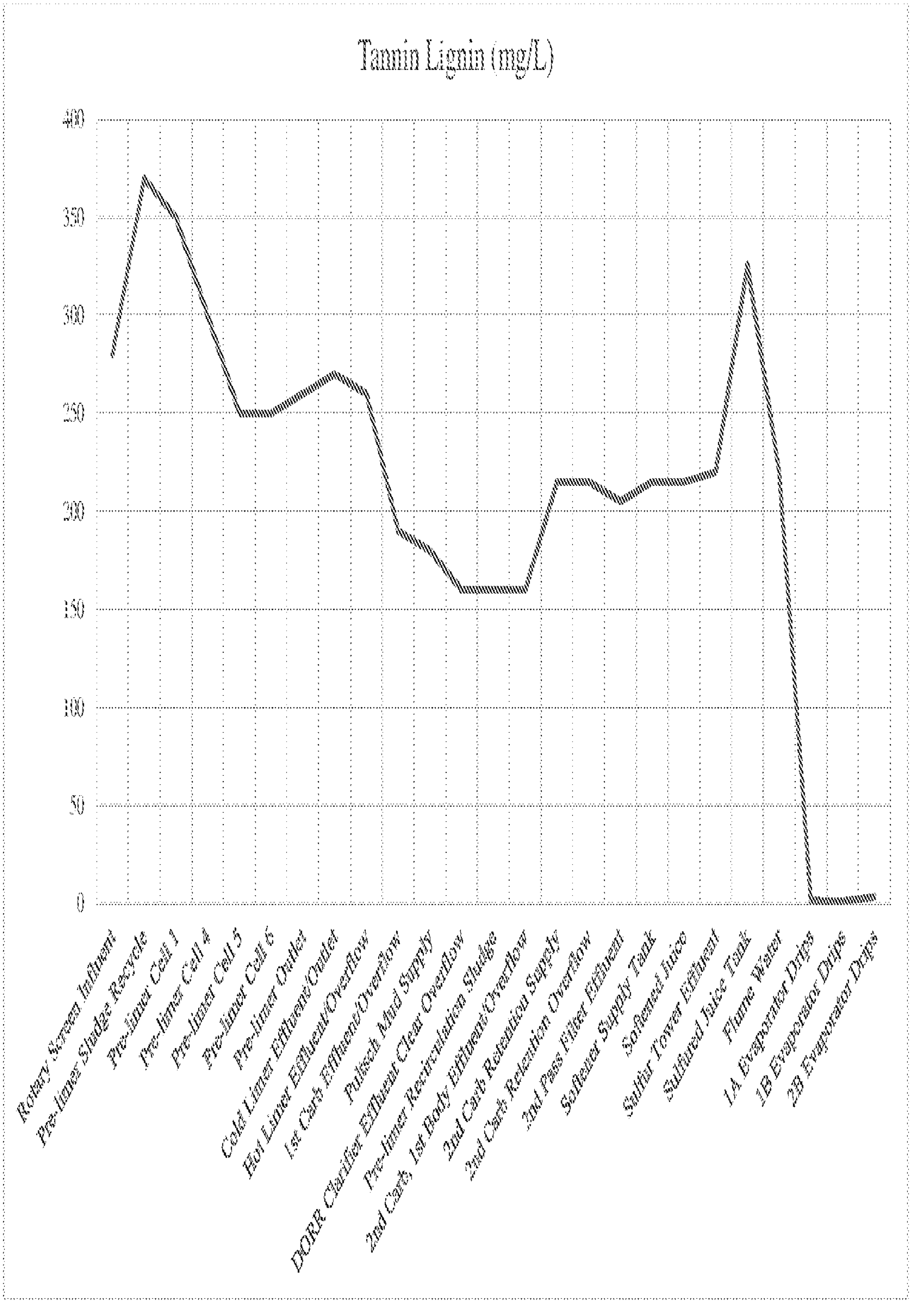
FIGS. 6A and 6B show tannin and lignin distribution over steps of a beet processing method according to disclosed embodiments.
Figure 6B:
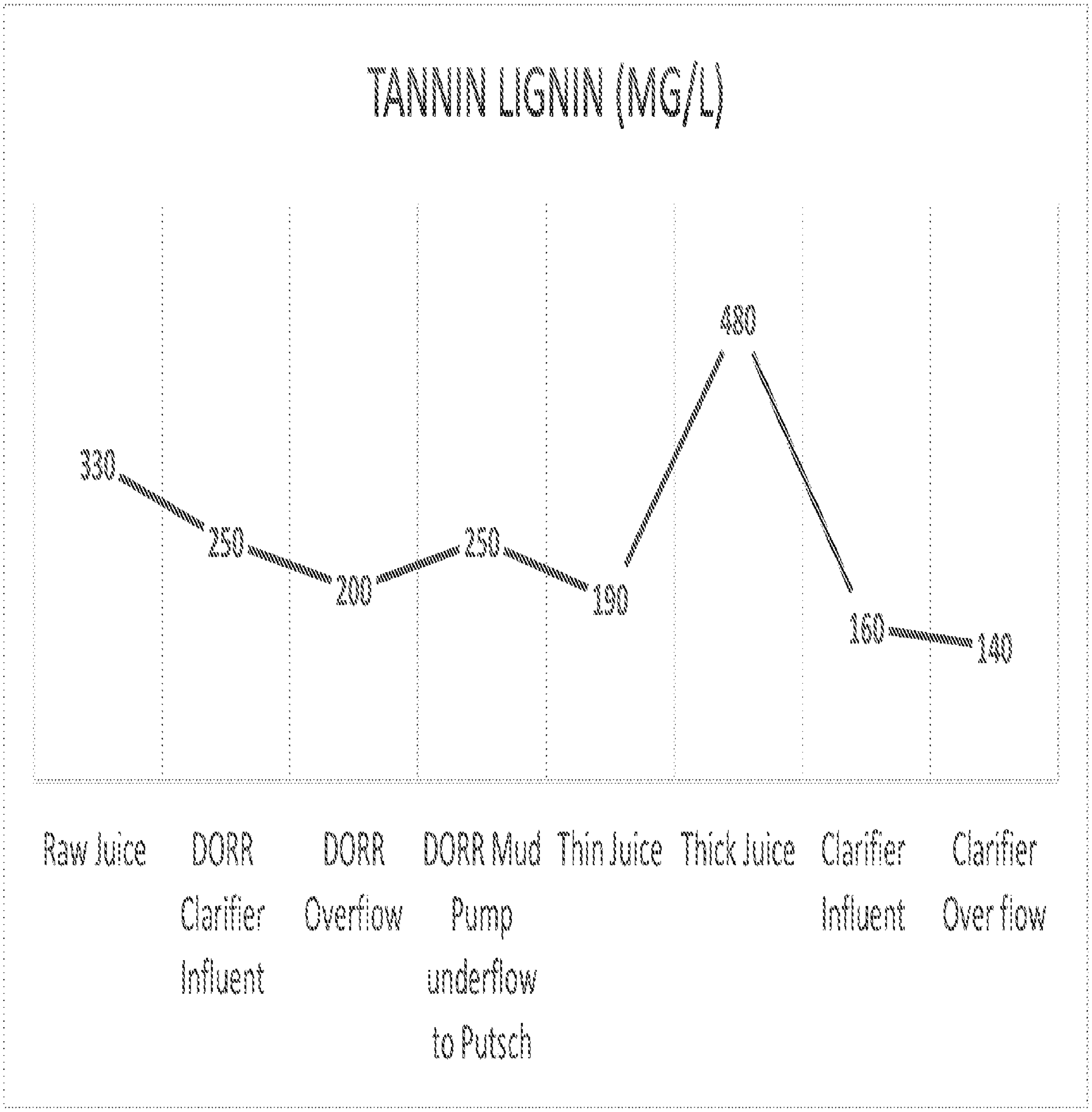
Figure 7A:
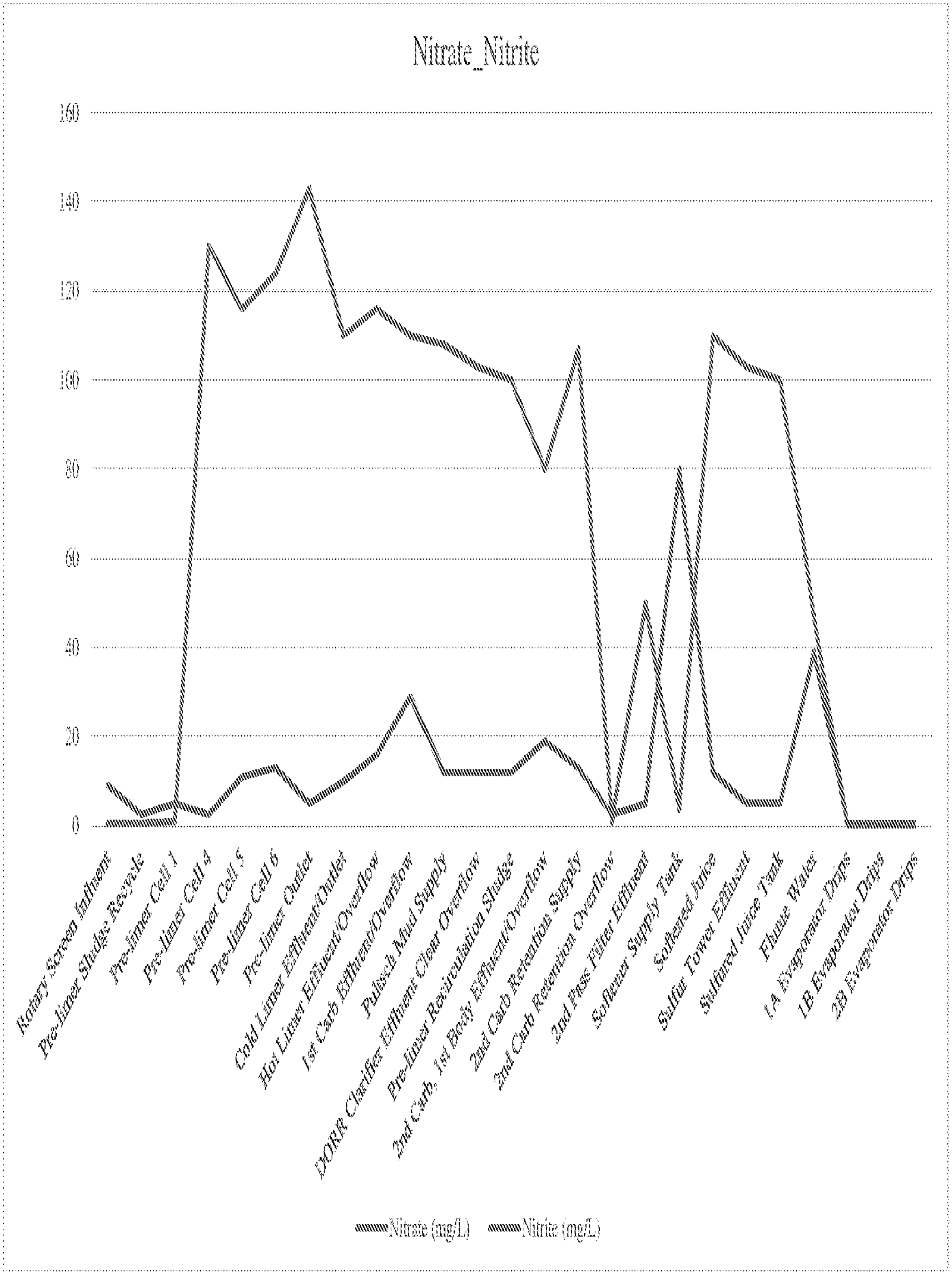
FIGS. 7A and 7B show a nitrate and nitrite distribution over steps of a beet processing method according to disclosed embodiments.
Figure 7B:
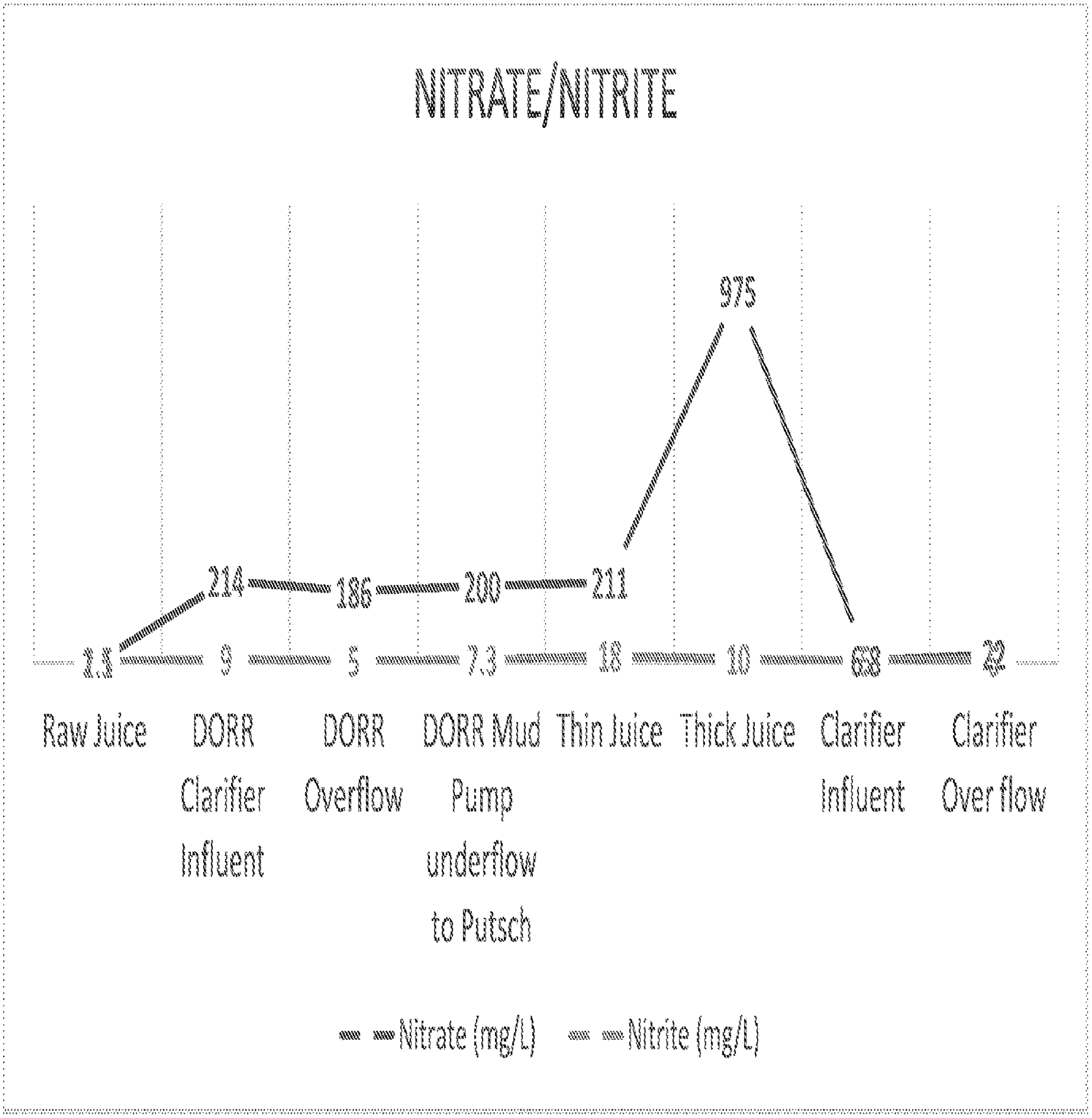
Figure 8A:
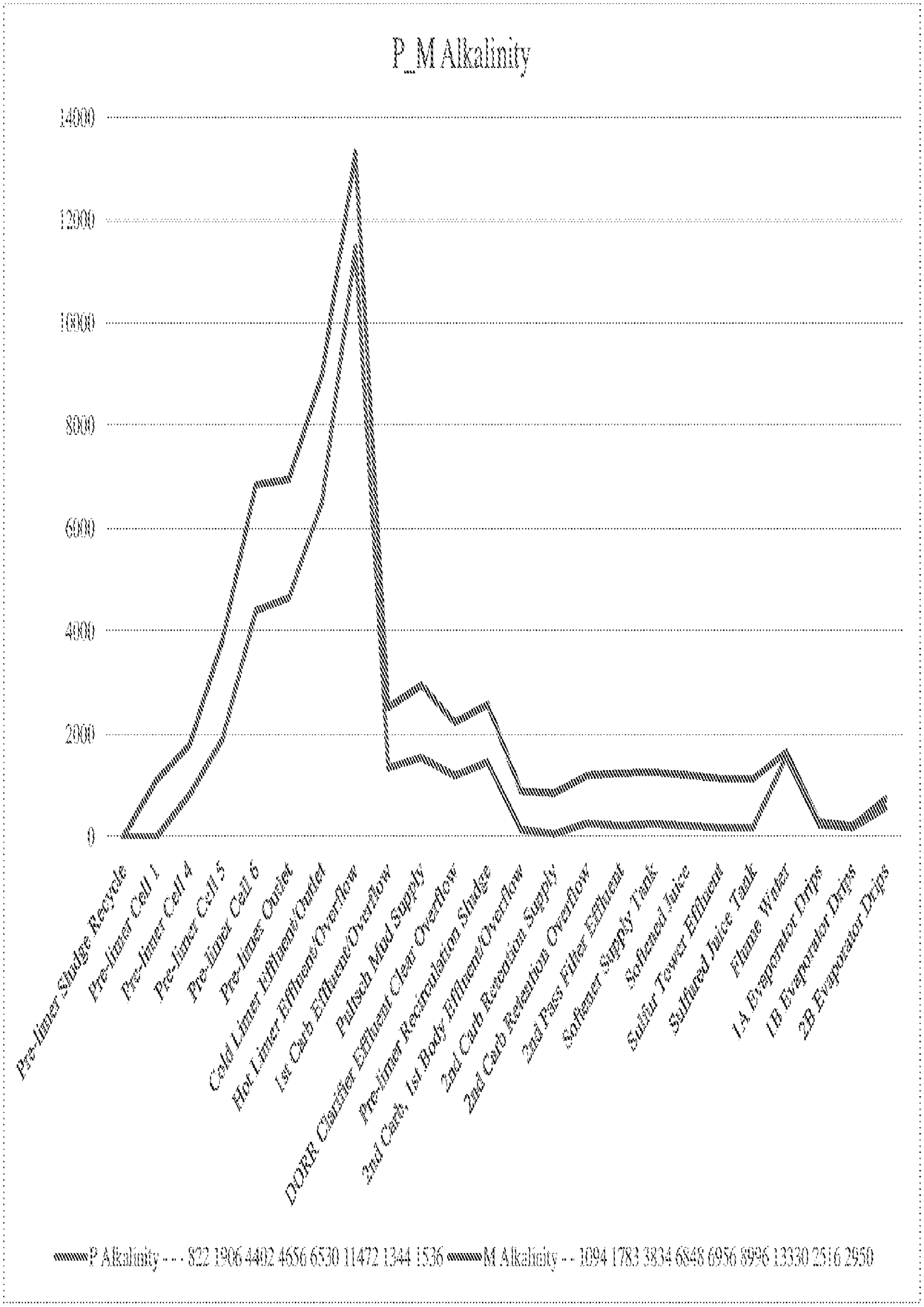
Figure 8B:
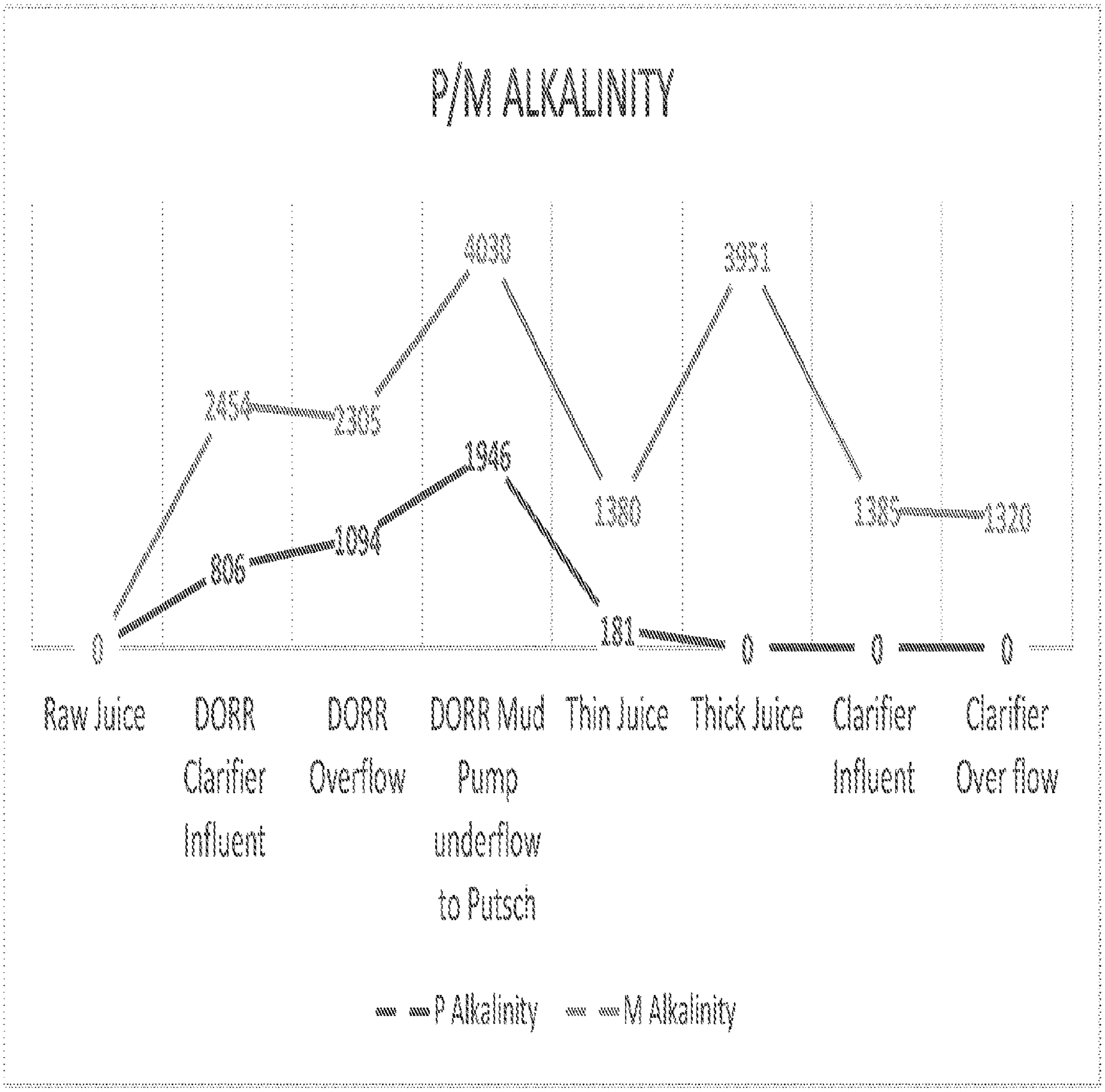

Initial testing after the diffuser gives the highest amount of lignin and tannin. The tannins and lignins steadily decrease throughout the purification process until the evaporator drips when most of the lignins and tannins are removed, as seen in FIGS. 6A and 6B. FIGS. 7A and 7B and FIGS. 8A and 8B further illustrate the nitrate/nitrate and P/M alkalinity, respectively, throughout the purification process.

Figure 3D:
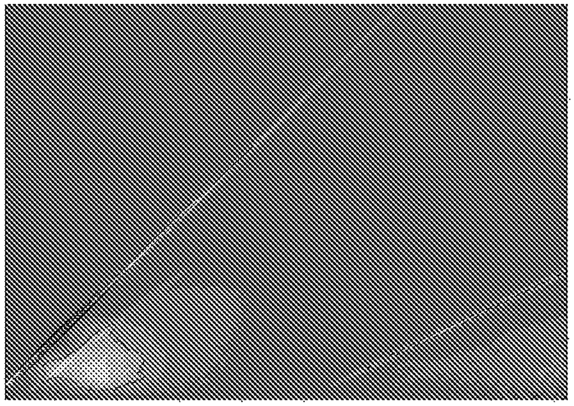
Figure 3E:
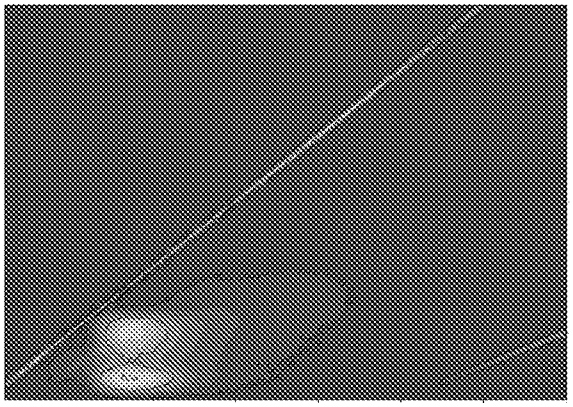

Despite the condensate, which is used as boiler feedwater, having no sugar as verified by refractometry and field Alpha Napthal testing, or tannins and lignins, it continued to foul standard liquor ($3^{rd}$) filters downstream indicating that additional undetected contaminants were present. In order to verify field results, the $1^{st}$ (FIG. 3D) and $2^{nd}$ (FIG. 3E) evaporator drips were analyzed using 3D fluorescence and unexpectedly revealed a new fluorescence spectrum that had not been present in previous analyses.

Figure 3F:
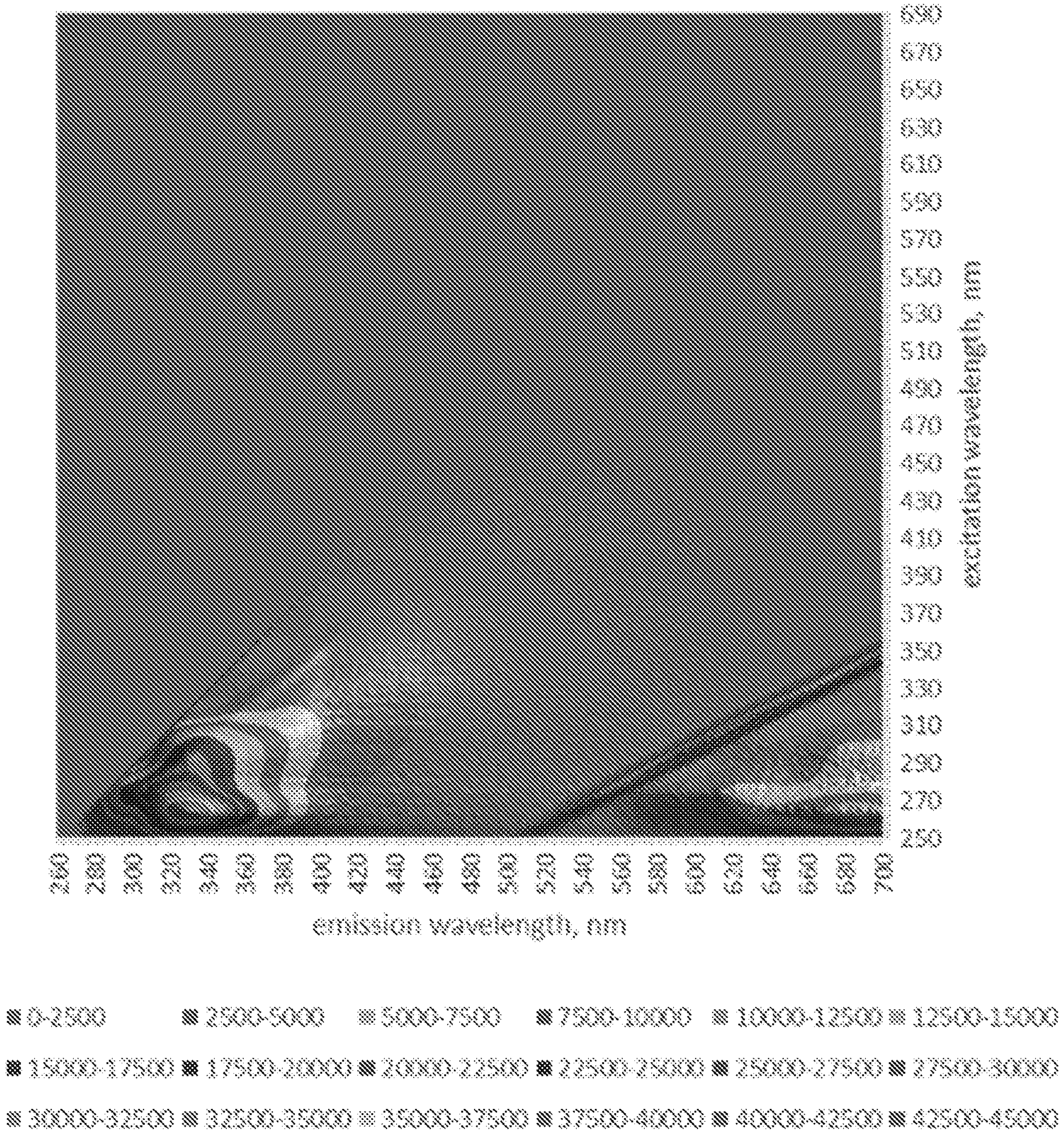

The fluorescence spectra shown in FIG. 3F gives an excitation/emission spectrum at much lower wavelengths with $1^{st}$ evaporator drips having an excitation/emission maximum at 274/334 nm and $2^{nd}$ evaporator drips having two maxima at 266/332 nm and 302/336 nm. Unlike previous studies, there was no indication of any excitation from 380-470 or emission from 395-480. The same result was also seen in a cane sugar facility on the evaporator condensate.

Figure 4A:
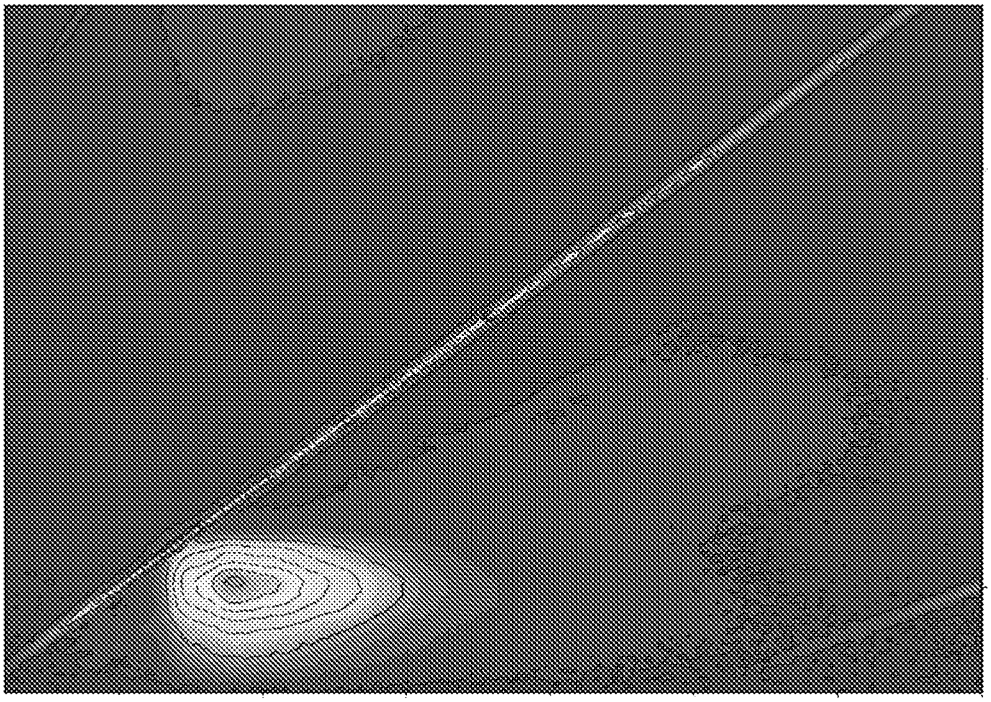
FIGS. 4A and 4B show three-dimensional fluorescence spectra after 80° C. distillation at the thin juice stage.
Figure 4B:
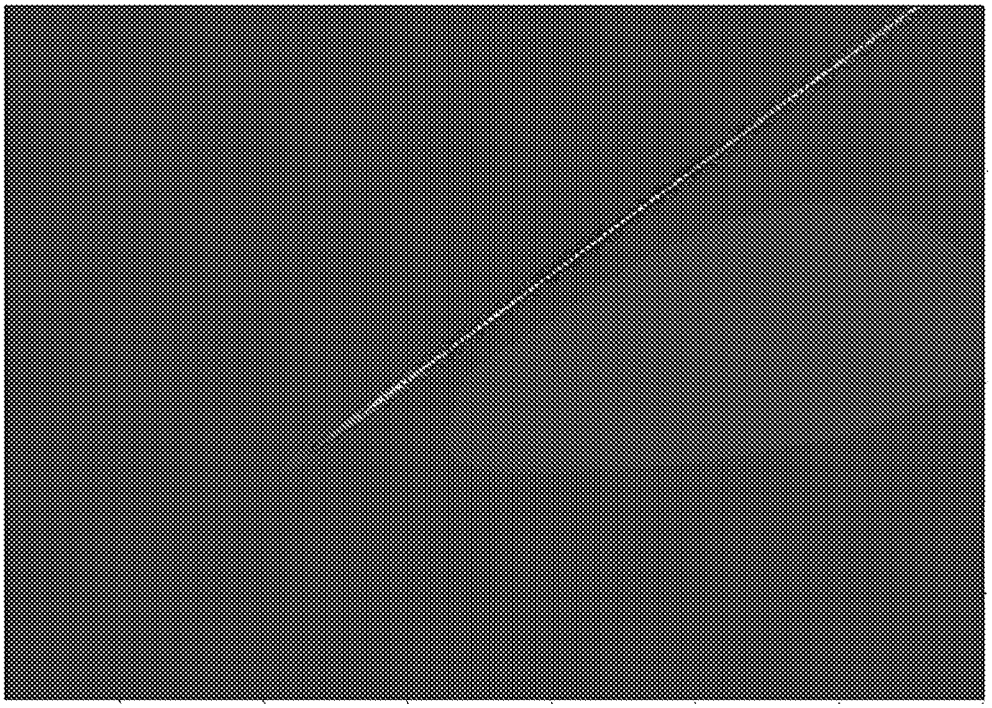

These results clearly indicate a previously undetected contaminant that is not present in the thin juice. Inventors theorized that this contaminant could be a breakdown product from the tannins and lignins found throughout the rest of the process. In order to test this theory, the thin juice, containing tannins and lignins, was submitted to a simulated evaporator process under reduced pressure at 80° C. During the lab experiment we were able to see 2.5 similar results seen in the field, with the simulated $1^{st}$ evaporator drips (distillate) having an intense fluorescence spectrum with a maximum excitation/emission at around 300/335, as shown in FIG. 4A. The simulated thick juice was analyzed and instead of seeing fluorescence intensity increase at 395/480 with increased concentration of solids, the fluorescence intensity decreased, as shown in FIG. 4B.

These results verify that the fluorescent species remaining in the thin juice after purification are thermally unstable, giving breakdown products which also fluoresce, albeit at a different wavelength. Due to the change in excitation/emission properties, these breakdown products would remain undetectable using a fluorometer that measured tannins and lignins found throughout the rest of the process. Additionally, these breakdown products are volatile enough to contaminate evaporator condensate and may be contributing to fouling in evaporator demisters and damage to boilers from pH excursions.

Figure 9A:
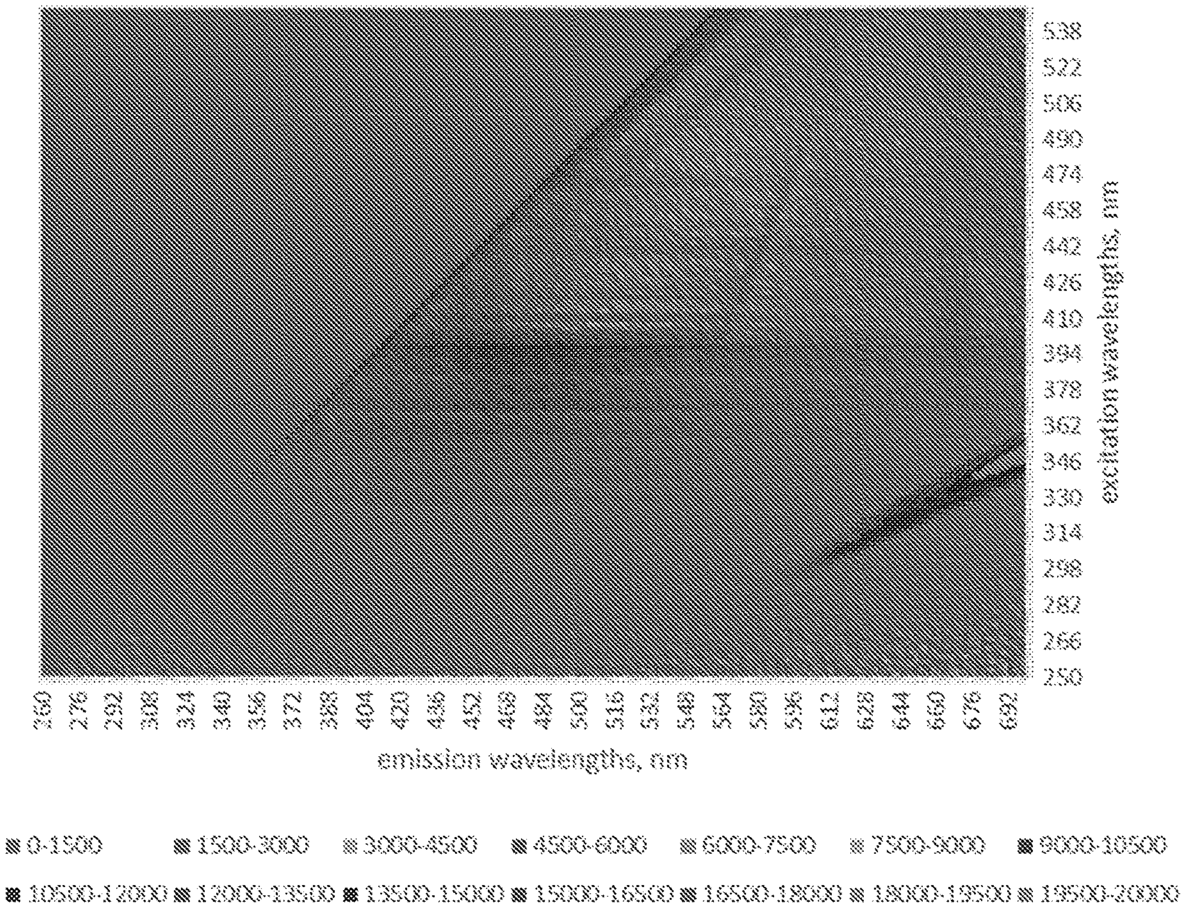
FIGS. 9A and 9B show 3D fluorescence scans in a clarifier underfloor step of a beet processing method according to disclosed embodiments.
Figure 9B:
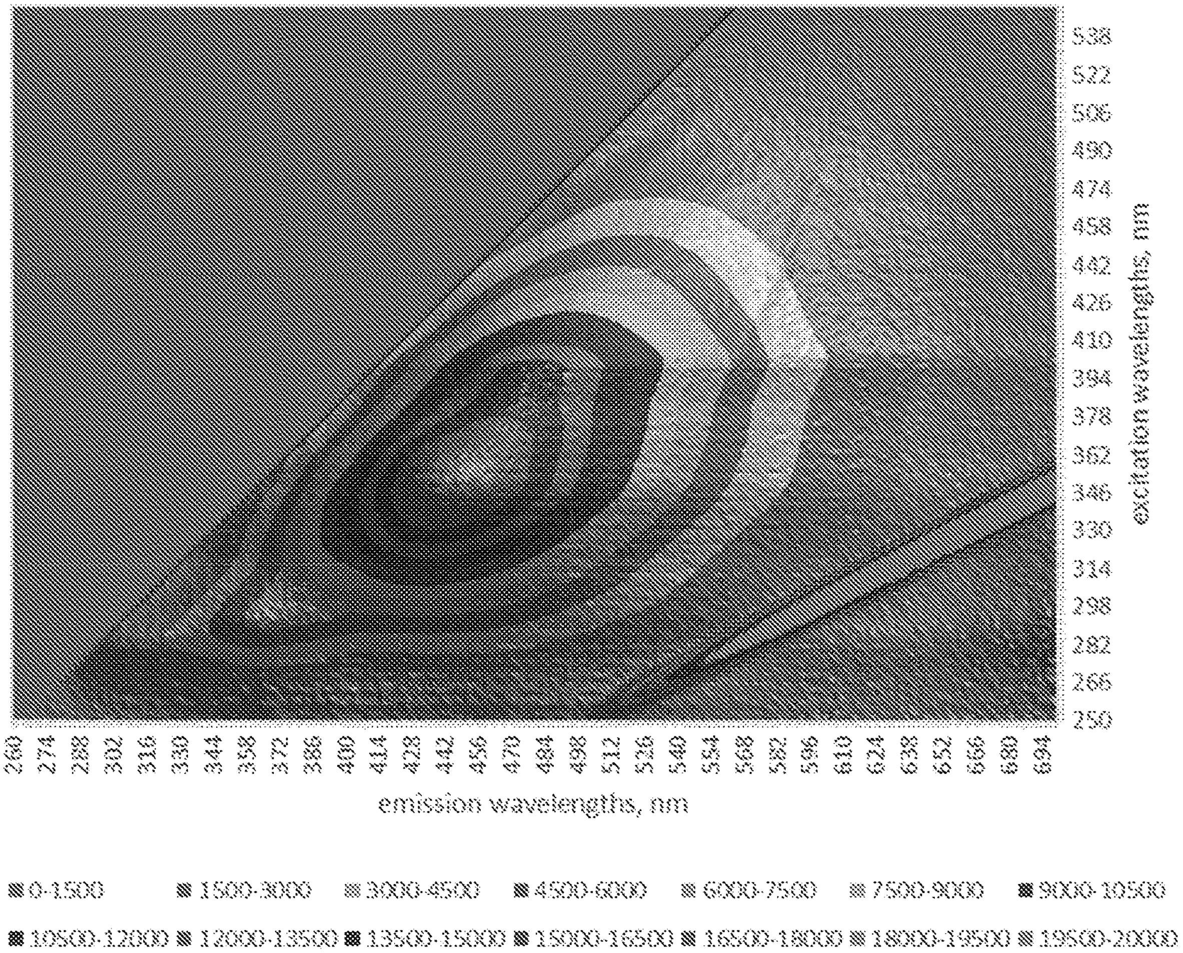

FIGS. 9A and 9B further show clarifier underflow 3D scans. FIG. 9A shows a clarifier underflow 3D scan were maximum excitation wavelength is approximately 404 nm. Maximum emission wavelength is approximately 494 nm. The intensity of fluorescence at those wavelengths is between 1500 and 3000 units. FIG. 9B shows a clarifier underflow 3D scan after filtering through a 1.5 μm nylon syringe filter. The maximum excitation wavelength is approximately 350 nm. The maximum emission wavelength is approximately 448 nm. The intensity of fluorescence at those wavelengths is between 16500 and 18000 units.

Example 2

Figure 10A:
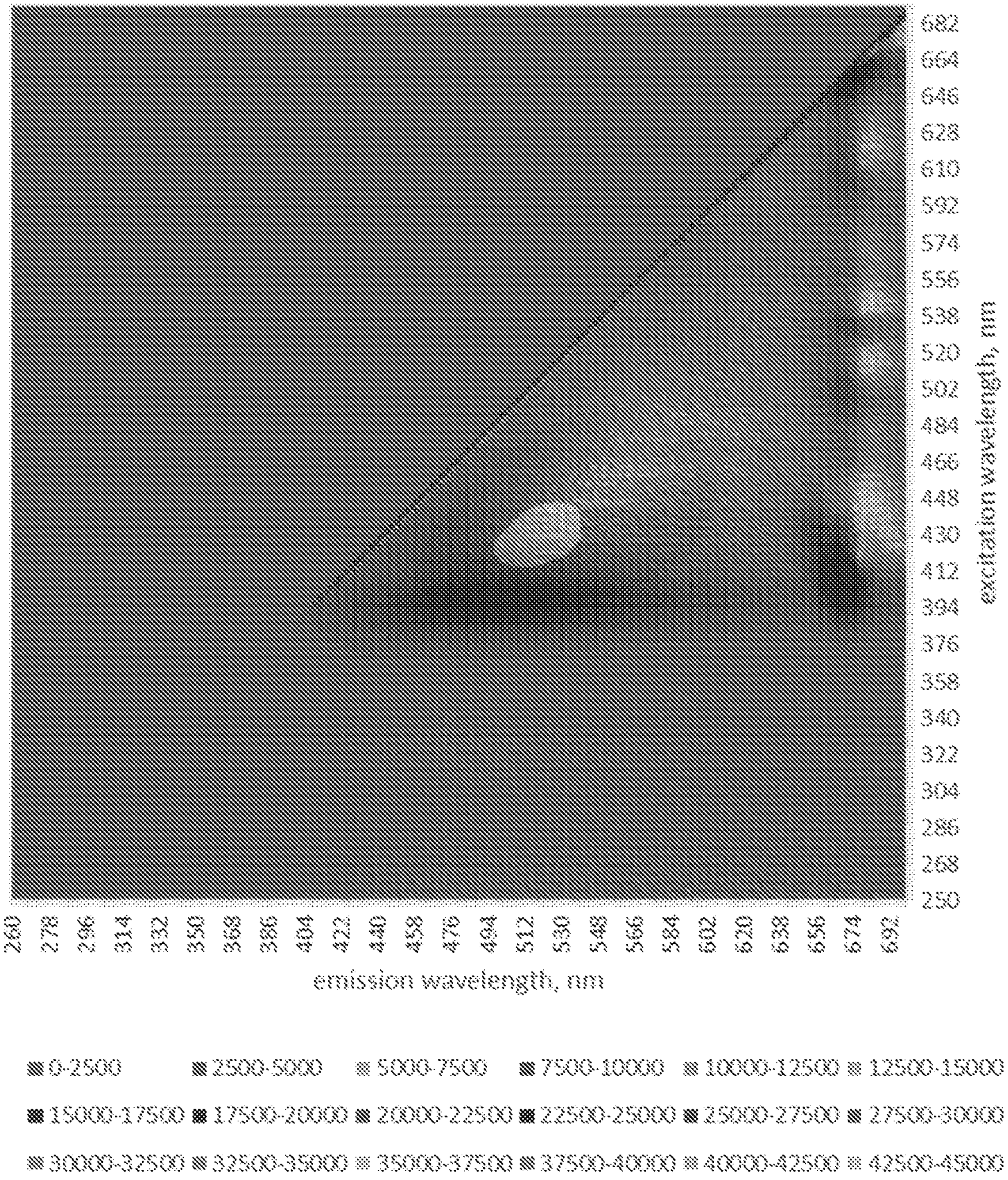
FIGS. 10A, 10B and 10C show 3D fluorescence scans in various steps of a beet processing method according to disclosed embodiments.
Figure 10B:
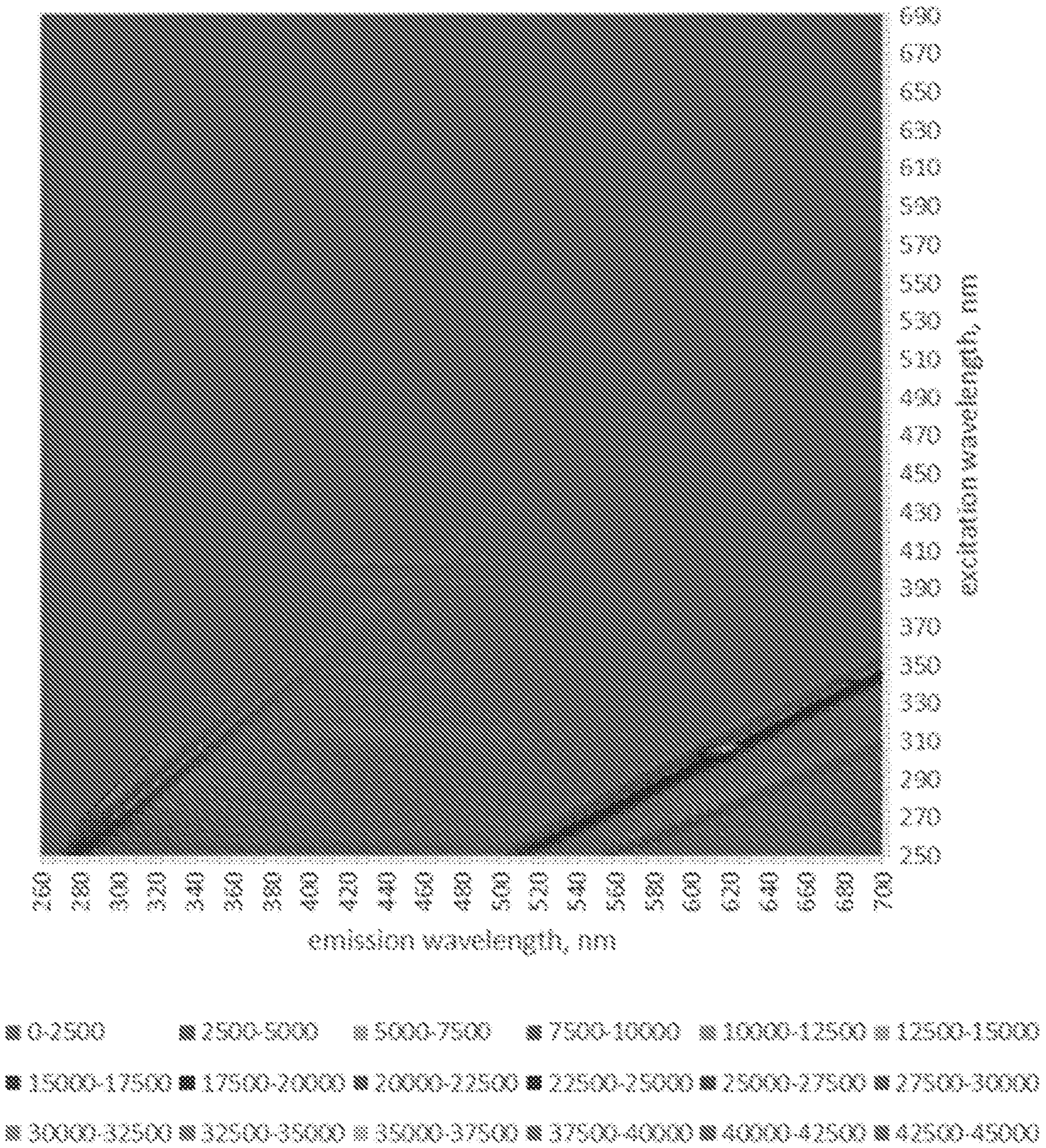
Figure 10C:
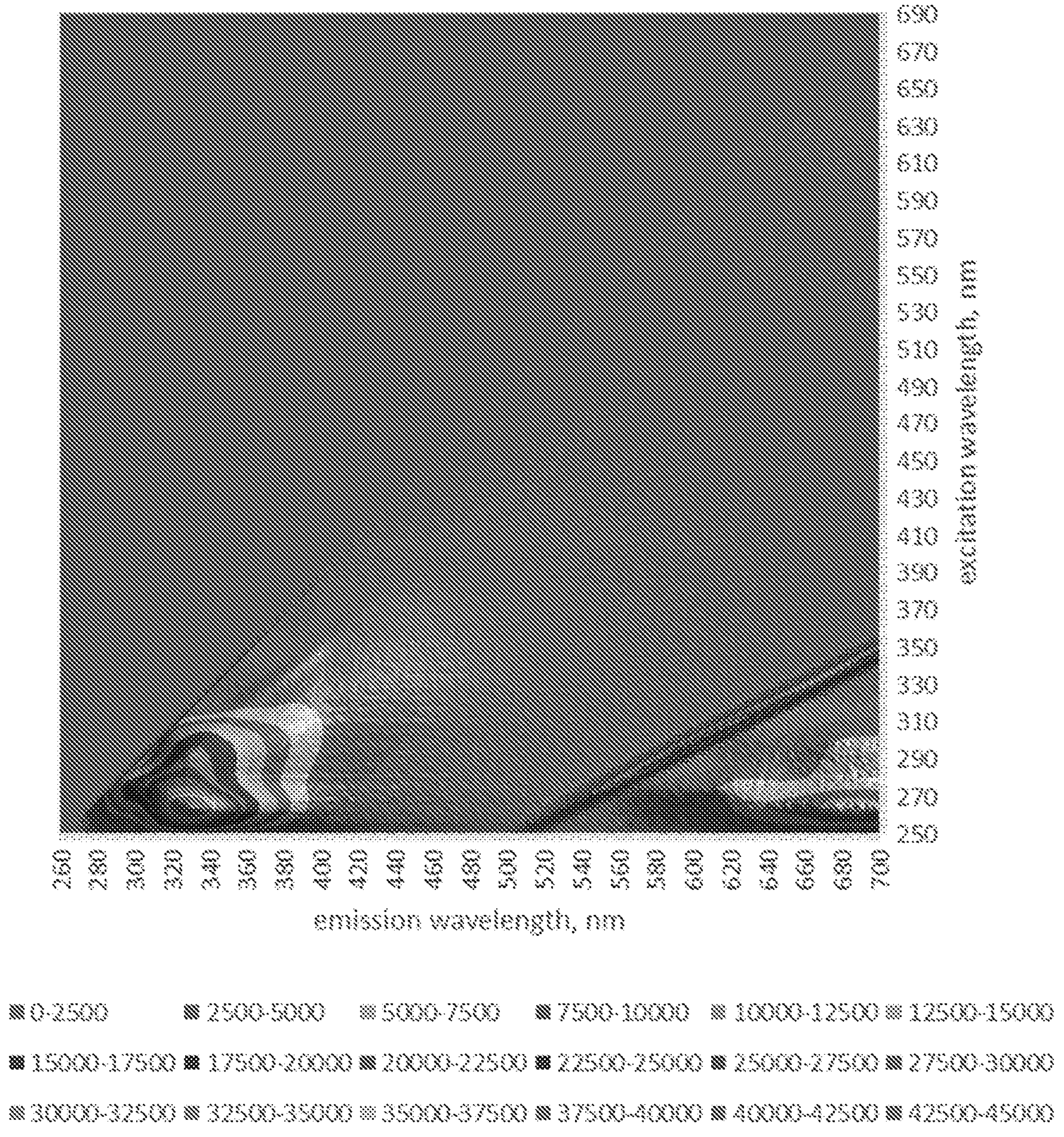

FIGS. 10A-10C show evaporator 3D scans from a facility that processes sugar cane. FIG. 10A shows an evaporator supply juice 3D Scan. FIG. 10B shows a first evaporator condensate 3D scan. FIG. 10C shows a second evaporator condensate 3D scan.

Example 3

Figure 11A:
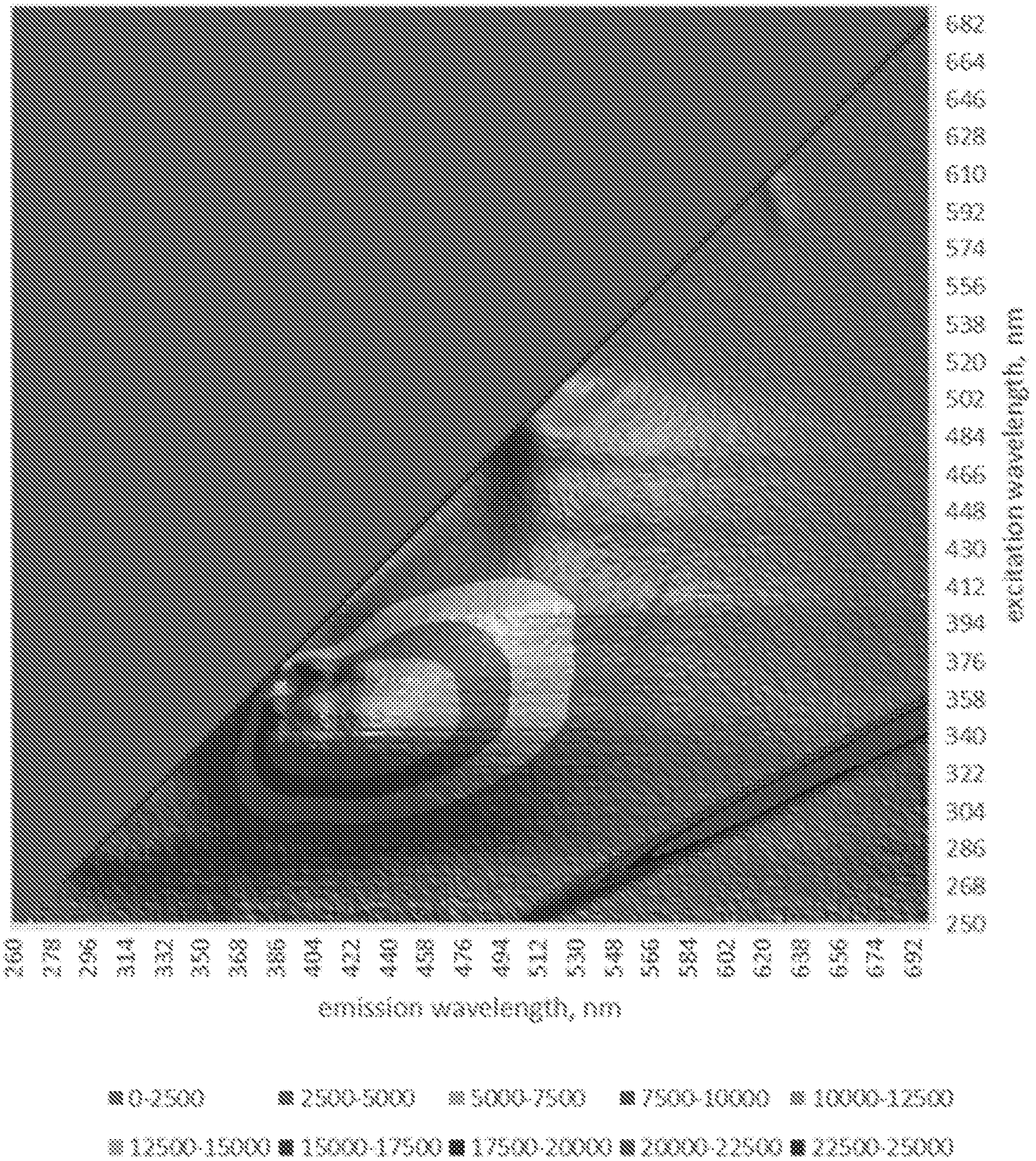
FIGS. 11A and 11B show 3D fluorescence scans in a clarifier inlet step of a beet processing method according to disclosed embodiments.
Figure 11B:
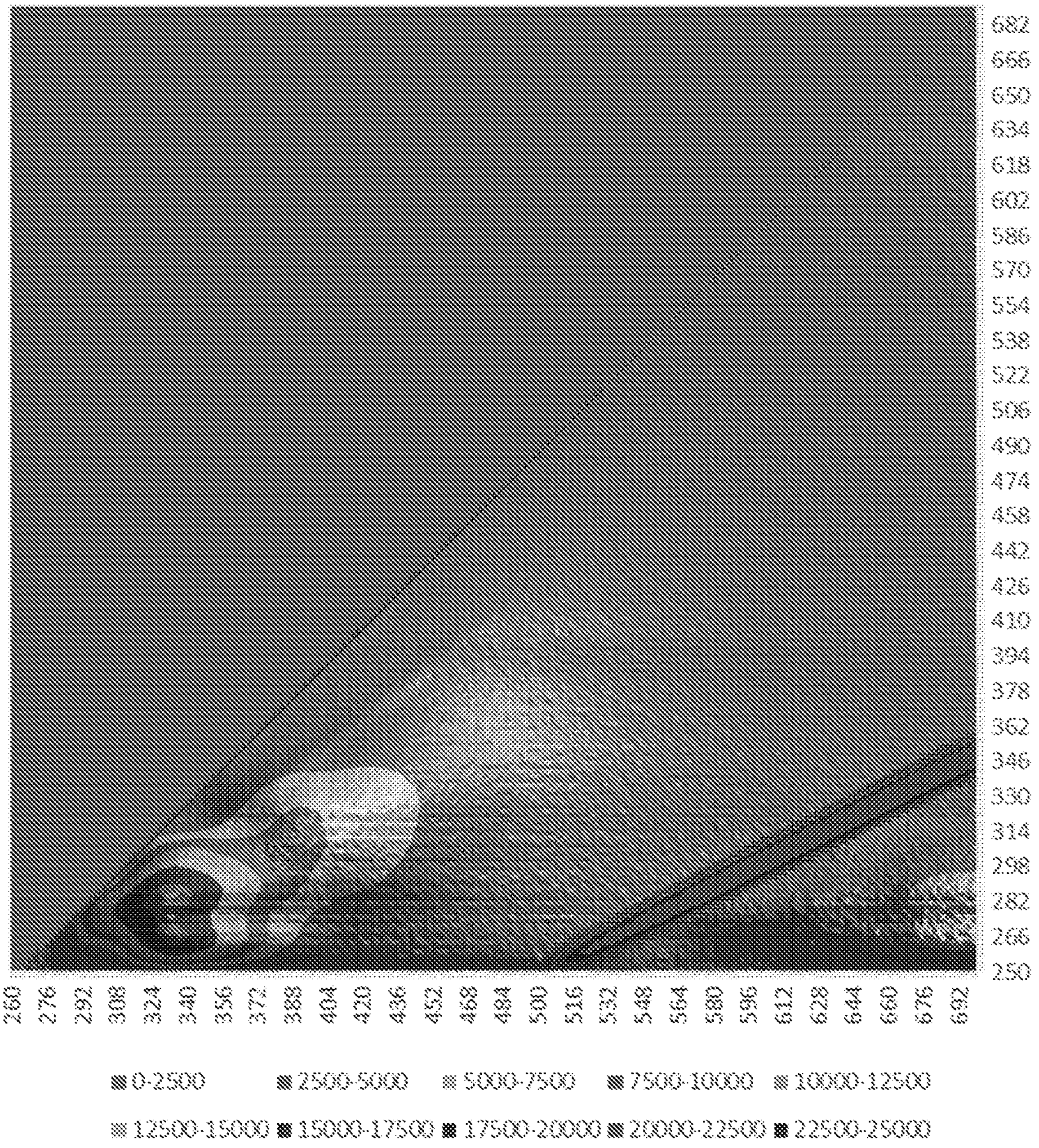

FIGS. 11A and 11B show 3D scans from a facility that processes sugar beets, FIG. 11A shows a pond 3 inlet 3D scan where maximum excitation wavelength is approximately 344 nm. Maximum emission wavelength is approximately 430 nm. The intensity of fluorescence at those wavelengths is between 12500 and 15000 units. FIG. 11B shows a condenser 3D scan where the maximum excitation wavelength is approximately 284 nm. The maximum emission wavelength is approximately 330 nm. The intensity of fluorescence at those wavelengths is between 20000 and 22500 units.

These results verify the presence of non-sugar contaminants in beet and cane sugar purification processes which contribute to boiler feedwater contamination and boiler upsets through an unexpected breakdown mechanism. These contaminants can be measured using fluorescence and cationic demand. Disclosed embodiments provide surprisingly beneficial methods for utilizing fluorescent and cationic demand probes for controlling contamination.

It will be appreciated that the above-disclosed features and functions, or alternatives thereof, may be desirably combined into different systems or methods. Also, various alternatives, modifications, variations or improvements may be subsequently made by those skilled in the art, and are also intended to be encompassed by the disclosed embodiments. As such, various changes may be made without departing from the spirit and scope of this disclosure.

What is claimed is:

1. A method or controlling an amount of an anionic contaminant in a stream of a sugar processing system, the method comprising:

determining an amount of the anionic contaminant in the stream using a fluorescence parameter of the anionic contaminant, the anionic contaminant selected from at least one of the group consisting of lignin, a lignin by-product, tannin, and a tannin by-product; and controlling an amount of the anionic contaminant in the stream based on the determined amount of the anionic contaminant in the stream.

2. The method for controlling the amount of anionic contaminant according to claim 1, wherein the amount of the anionic contaminant is determined in a thin juice stage of the sugar processing system.

3. The method for controlling the amount of anionic contaminant according to claim 1, wherein the anionic contaminant is the lignin by-product or the tannin by-product, and the amount is determined downstream of a thin juice stage of the sugar processing system.

4. The method for controlling the amount of anionic contaminant according to claim 1, wherein the anionic contaminant is undetectable using the fluorescence parameter in a thin juice stage of the sugar processing system.

5. The method for controlling the amount of anionic contaminant according to claim 1, wherein controlling the amount of the anionic contaminant in the stream includes removing at least some of the anionic contaminant from the stream.

6. The method for controlling the amount of anionic contaminant according to claim 5, wherein removing the at least some of the anionic contaminant from the stream includes destroying, neutralizing or precipitating the anionic contaminant.

7. The method for controlling the amount of anionic contaminant according to claim 6, wherein removing the at least some of the anionic contaminant from the stream includes precipitating the anionic contaminant by adding a precipitator compound that precipitates the anionic contaminant from the stream.

8. The method for controlling the amount of anionic contaminant according to claim 5, wherein the removing step occurs upstream of a boiler stage in the sugar processing system.

9. The method for controlling the amount of anionic contaminant according to claim 1, wherein the anionic contaminant is selected from at least one of the lignin and the tannin.

10. The method for controlling the amount of anionic contaminant according to claim 1, wherein the anionic contaminant is selected from at least one of the lignin by-product and the tannin by-product.

11. The method for controlling the amount of anionic contaminant according to claim 10, wherein the sugar processing system includes at least one evaporator and the fluorescence parameter is measured in a condensate of the evaporator.

12. The method for controlling the amount of anionic contaminant according to claim 1, wherein the fluorescence parameter is an excitation intensity at a wavelength in a range of 380-470 nm.

13. The method for controlling the amount of anionic contaminant according to claim 1, wherein the fluorescence parameter is an emission intensity at a wavelength in a range of 440-540 nm.

14. A method for controlling an amount of an anionic contaminant in a stream of a sugar processing system, the method comprising:

determining an amount of the anionic contaminant in the stream by determining a cationic demand parameter of the anionic contaminant downstream of a stage of the sugar processing system that adds heat to the stream, the anionic contaminant selected from at least one of the group consisting of lignin, a lignin by-product, tannin, and a tannin by-product; and controlling an amount of the anionic contaminant in the stream based on the determined amount of the anionic contaminant in the stream.

* * * * *